United States Patent [19]

Paspek et al.

[11] Patent Number: 4,981,579

[45] Date of Patent: Jan. 1, 1991

[54] PROCESS FOR SEPARATING EXTRACTABLE ORGANIC MATERIAL FROM COMPOSITIONS COMPRISING SAID EXTRACTABLE ORGANIC MATERIAL INTERMIXED WITH SOLIDS AND WATER

[75] Inventors: S. C. Paspek, Broadview; C. P. Eppig, Cleveland Hts.; W. F. Schuller, Fairview Park; R. D. Littler, Chagrin Falls; J. B. Hauser, Middleburgh Hts.; A. R. Rohlik, Macadonia, all of Ohio

[73] Assignee: The Standard Oil Company, Cleveland, Ohio

[21] Appl. No.: 278,967

[22] Filed: Dec. 2, 1988

Related U.S. Application Data

[63] Continuation-in-part of Ser. No. 906,727, Sep. 12, 1986, abandoned.

[51] Int. Cl.$^5$ .............................................. C10G 21/02
[52] U.S. Cl. ..................... 208/314; 208/13; 208/337; 210/806
[58] Field of Search ................. 208/314, 13, 335, 337, 208/177, 179; 210/806; 585/836

[56] References Cited

U.S. PATENT DOCUMENTS

| Re. 31,913 | 6/1985 | Barger | 422/267 |
|---|---|---|---|
| 2,037,218 | 4/1936 | Empson | 210/48 |
| 2,235,639 | 3/1941 | Koch | 196/5 |
| 2,272,372 | 2/1942 | Hixson et al. | 208/314 |
| 2,330,054 | 9/1943 | Hibshman | 288/314 |

(List continued on next page.)

FOREIGN PATENT DOCUMENTS

| 0260064 | 3/1988 | European Pat. Off. |
|---|---|---|
| 0298610 | 1/1989 | European Pat. Off. |
| 3345563 | 7/1985 | Fed. Rep. of Germany |
| 3404133 | 8/1985 | Fed. Rep. of Germany |
| 1364942 | 8/1974 | United Kingdom |
| 1373023 | 11/1974 | United Kingdom |
| 2001670 | 2/1979 | United Kingdom |
| 2033244 | 5/1980 | United Kingdom |

OTHER PUBLICATIONS

Kingley, G. S., "Pilot Plant Evaluation of Critical Extractions for Environmental Applications", Critical Fluid Systems, Inc., EPA Contract No. 68-02-3924, EPA/600/-2-85/081, Jul., 1985.

Mitchell, David L., et al., "The Solubility of Asphaltenes in Hydrocarbon Solvents", Fuel vol. 52, Apr. 1973, pp. 149-152.

L. A. Duval, "Steel Industry Sludge is Being Reused", (List continued on next page.)

*Primary Examiner*—Anthony McFarlane
*Attorney, Agent, or Firm*—Larry W. Evans; David J. Untener; Teresan W. Gilbert

[57] ABSTRACT

This invention provides for a process for separating extractable organic material from a feed composition comprising said extractable organic material intermixed with solids and water, the process comprising the steps of: (A) contacting said feed composition with a first organic solvent, said first organic solvent being capable of dissolving at least about ten parts of said extractable organic material per million parts of said first organic solvent at the temperature wherein at least about 50% by weight of said first organic solvent boils at atmospheric pressure; dissolving at least part of said extractable organic material in said first organic solvent to form a first solution; and separating at least part of said first solution from said feed composition to provide an intermediate composition, part of said first organic solvent remaining intermixed with said intermediate composition; and (B) contacting said intermediate composition with a volatile organic solvent, said voltile organic solvent being capable of dissolving at least about ten parts of said first organic solvent per million parts of said volatile organic solvent at the temperature wherein at least about 50% by weight of said volatile organic solvent boils at atmospheric pressure; dissolving at least part of said first organic solvent in said volatile organic solvent to form a second solution; and separating said second solution from said intermediate composition to provide a treated product.

71 Claims, 4 Drawing Sheets

U.S. PATENT DOCUMENTS

| | | | |
|---|---|---|---|
| 2,383,362 | 8/1945 | Batchelder | 196/5 |
| 2,383,363 | 8/1945 | Batchelder | 196/4 |
| 2,454,653 | 11/1948 | Kamp | 210/55 |
| 2,886,523 | 5/1959 | Claridge et al. | 208/314 |
| 2,964,465 | 12/1960 | Brown et al. | 208/314 |
| 3,184,401 | 5/1965 | Gorin | 208/8 |
| 3,202,605 | 8/1965 | Redcay | 208/337 |
| 3,249,532 | 5/1966 | Shiah | 208/321 |
| 3,417,014 | 12/1968 | Lumpkin | 208/187 |
| 3,441,499 | 4/1969 | Francis et al. | 208/187 |
| 3,492,365 | 1/1970 | Anderson et al. | 208/314 |
| 3,506,564 | 4/1970 | Cone | 208/33 |
| 3,696,021 | 10/1972 | Cole et al. | 208/13 |
| 3,711,400 | 1/1973 | Cole et al. | 210/21 |
| 3,725,254 | 4/1973 | Wang | 208/314 |
| 3,761,402 | 9/1973 | Atwood | 208/314 |
| 3,764,008 | 10/1973 | Darley et al. | 210/73 |
| 3,789,077 | 1/1974 | Kosseim et al. | 260/674 SE |
| 3,867,275 | 2/1975 | Gleim et al. | 208/431 |
| 3,883,420 | 5/1975 | Stone | 208/325 |
| 3,917,564 | 11/1975 | Meyers | 208/131 |
| 3,997,425 | 12/1976 | Gatsis et al. | 208/8 |
| 4,017,383 | 4/1977 | Beavon | 208/309 |
| 4,025,424 | 5/1977 | Reichhardt et al. | 210/23 R |
| 4,035,281 | 7/1977 | Espenscheid et al. | 208/8 |
| 4,040,958 | 8/1977 | Rammler | 210/73 R |
| 4,073,719 | 2/1978 | Whisman et al. | 208/180 |
| 4,075,080 | 2/1978 | Gorin | 208/8 |
| 4,079,004 | 3/1978 | Tan et al. | 210/52 |
| 4,079,005 | 3/1978 | Tan et al. | 210/52 |
| 4,081,360 | 3/1978 | Tan et al. | 208/8 |
| 4,094,781 | 6/1978 | Snell et al. | 210/54 |
| 4,124,486 | 11/1978 | Nolley | 208/95 |
| 4,211,638 | 7/1980 | Akell et al. | 208/180 |
| 4,224,136 | 9/1980 | Zukacker et al. | 208/82 E |
| 4,260,473 | 4/1981 | Bauer | 208/14 |
| 4,260,489 | 4/1981 | Greig et al. | 210/771 |
| 4,267,061 | 5/1981 | Sims et al. | 210/772 |
| 4,273,644 | 6/1981 | Harris et al. | 208/321 |
| 4,311,561 | 1/1982 | Hastings | 196/14.52 |
| 4,335,001 | 6/1982 | Yues et al. | 210/708 |
| 4,341,619 | 7/1982 | Poska | 208/11 LE |
| 4,353,794 | 10/1982 | Winter et al. | 208/325 |
| 4,354,928 | 10/1982 | Audeh et al. | 208/309 |
| 4,374,015 | 2/1983 | Brulé | 208/415 |
| 4,389,300 | 6/1983 | Mitchell | 208/390 |
| 4,415,442 | 11/1983 | Rhodes | 208/177 |
| 4,416,764 | 11/1983 | Gikis et al. | 208/11 C E |
| 4,434,028 | 2/1984 | Eppig | 196/14.52 |
| 4,444,654 | 4/1984 | Cargle et al. | 208/188 |
| 4,450,067 | 5/1984 | Angevine et al. | 208/86 |
| 4,476,012 | 10/1984 | Gatsis | 208/251 R |
| 4,501,671 | 2/1985 | Bozell | 210/781 |
| 4,502,944 | 3/1985 | Nelson | 208/45 |
| 4,517,099 | 5/1985 | Breckner | 210/741 |
| 4,519,848 | 5/1985 | Underwood | 134/34 |
| 4,536,283 | 8/1985 | Davis | 208/309 |
| 4,550,090 | 10/1985 | Degnan et al. | 502/25 |
| 4,568,447 | 2/1986 | Pujado et al. | 208/177 |
| 4,572,777 | 2/1986 | Peck | 208/551 R |
| 4,634,520 | 1/1987 | Angelov et al. | 208/309 |
| 4,664,788 | 5/1987 | Gir et al. | 208/415 |
| 4,675,101 | 6/1987 | Warzinski | 208/314 |
| 4,686,048 | 8/1987 | Atherton et al. | 210/771 |
| 4,715,932 | 12/1987 | Misselhorn | 203/43 |
| 4,741,806 | 5/1988 | Scinta | 196/14.52 |
| 4,741,807 | 5/1988 | Wilhelm et al. | 196/14.52 |
| 4,741,840 | 5/1988 | Atherton et al. | 210/771 |

OTHER PUBLICATIONS

Environmental Science and Technology, vol. 9, p. 624 (1975).

M. J. Deitrich, T. L. Randall, and P. J. Canney, "Wet Oxidation of Hazardous Organics in Wastewater", Environmental Progress, Aug. 1985, p. 171.

C. C. Allen et al., "Techniques for Treating Hazardoux Wastes to Remove Volatile Organic Constituents", Journal of Air Pollution Control Assosciation, vol. 35, No. 8, pp. 841-848, (1985).

Shell Oil Co. letter of Jan. 8, 1990 to EPA RCRA DKX OS-305.

PROCESS FOR SEPARATING EXTRACTABLE ORGANIC MATERIAL FROM COMPOSITIONS COMPRISING SAID EXTRACTABLE ORGANIC MATERIAL INTERMIXED WITH SOLIDS AND WATER

This application is a continuation-in-part of U.S. application Ser. No. 906,727, filed Sept. 12, 1986 now abandoned. The disclosure of said prior application is incorporated herein in its entirety.

TECHNICAL FIELD

This invention relates to a process for separating an extractable organic material from a composition comprising said extractable organic material intermixed with solids and water. This invention is particularly suitable for separating undesirable organics from solid wastes and hazardous wastes (e.g., petroleum waste, refinery sludge, and the like). It is also suitable for extracting oil from seeds (e.g., cotton seeds), corn, soybeans, etc.; and for extracting oil from oil-contaminated catalyst fines, filter aids, drill cuttings, steel mill waste, bleaching clay, etc. The process is also useful for cleaning filter beds, waste-contaminated soil, etc., and for extracting bitumen from tar sands.

BACKGROUND OF THE INVENTION

Oily wastewater streams are generated at many different refinery processing units and discharged to a refinery wastewater treatment system where treatment by gravity separation and dissolved air flotation generates oily solid streams. These oily solid wastes are regulated under the Resource, Conservation, and Recovery Act (RCRA) as listed hazardous wastes. Additionally, sludge from leaded product tanks, slop oil emulsion solids, and heat exchanger bundle solids are considered listed hazardous waste. These sludges as a group are typically 4-6% solids and 15-20% oil as generated. 15,000 to 20,000 gal/day are generated at a typical petroleum refinery.

Many refineries currently deliquify these wastes and either land dispose or land treat the remaining solids. However, the 1984 Amendments to RCRA required the Environmental Protection Agency (EPA) to identify and promulgate a system of pretreatment of all hazardous wastes prior to land disposal or land treatment. EPA's choice of pretreatment was required to be based on the best demonstrated available technology and was required by Congress to be in effect by Aug. 8, 1988 for petroleum refinery wastes. If EPA did not meet this deadline, the legislative "hammer" would be the automatic prohibition of land disposal for the waste in question. This prohibition would take effect May 8, 1990. Various technologies for treating listed hazardous refinery oil sludges to render them delistable or acceptable for land disposal under the RCRA landban have been suggested, but none have been found to be entirely satisfactory.

U.S. Pat. No. 4,311,561 discloses a method for extracting bitumen from tar sand wherein the tar sand and a solvent flow in one direction through a plurality of interconnected individually sealed extraction chambers with the flow of extracted bitumen and solvent counter to the flow of tar sand and solvent. The solvents identified as being useful are hexane, pentane, benzene, halogenated liquids and xylene. The amount of bitumen in the tar sand is progressively reduced from reaction chamber to reaction chamber until the final chamber where sand and solvent alone are treated with hot water to remove the solvent and then discharge pure sand.

U.S. Pat. No. 4,341,619 discloses a process for recovering carbonaceous materials from tar sands by supercritical extraction involving countercurrent flow of the tar sand and a solvent. The solvents that are disclosed as being useful include aromatic hydrocarbons, alicyclic hydrocarbons having 5-16 carbon atoms, phenols, and nitrogen-containing compounds.

U.S. Pat. No. 4,415,442 discloses a process for the separation of entrained organic fluids from gaseous streams in a coal deashing system wherein a feed consisting of solvent, soluble coal products and insoluble coal products are placed in a first separation zone. A first heavy fraction is withdrawn from the first separation zone and the pressure level is reduced by at least 100 psig to vaporize the solvent and yield the insoluble coal products in a relatively dry, powdery form referred to in the specification as "an ash concentrate". The ash concentrate and solvent are mixed with a carrier fluid, the mixing being sufficient to obtain a turbulent flow and to scrub the vaporized solvent. The scrubbing of the vaporized solvent removes entrained organic fluids from it. The mixture is then placed in a second separation zone wherein the scrubbed solvent is separated from ash concentrate. Among the solvents described as being useful are aromatic hydrocarbons (e.g., benzene, xylene), cycloparaffins (e.g., cyclohexane), open chain monoolefins having boiling points below about 310° F. (e.g., butene, pentene), and open chain saturated hydrocarbons having boiling points below about 310° F. (e.g., pentane, hexane, heptane).

U.S. Pat. No. 4,434,028 discloses a process for removing oil and other organic constituents from particulate, inorganic-rich mineral solids (e.g., oil-contaminated drill cuttings) using an extractant that is in a gaseous state at atmospheric pressure and ambient temperature and is converted to a liquid or supercritical fluid during the extraction process. Extractants that are described as being useful are carbon dioxide, ethane, ethylene, propane, propylene, other hydrocarbons, and the gaseous halogenated hydrocarbons such as dichlorodifluoromethane. The process involves the steps of: separating the drill cuttings from a drilling mud in a separator; slurrying the cuttings using an oil or aqueous liquid in a slurry tank; conveying the slurry to an extractor column; circulating liquefied extractant through the extractor column in contact with the drill cuttings until the desired level of oil is extracted; advancing the extractant-oil mixture from the extractor column through a pressure reduction valve to a separator-evaporator wherein the extractant-oil mixture separates into two phases, one being an extractant phase, the other being an oil-enriched phase. The extractant phase is recirculated to the extractor column. The oil-enriched phase is subjected to subsequent separations wherein the extractant is separated from the oil. Upon completion of the extraction cycle, a water piston is advanced through the extractor column to remove remaining oil and extractant from the drill cuttings. Water is then added to the clean drill cuttings to form a slurry in the extractor column which is removed and disposed of or further treated.

U.S. Pat. No. 4,450,067 discloses a process for producing low CCR maltenic fractions and high CCR asphaltenic fractions from hydrocarbonaceous residua and other heavy oils by multisolvent-distillationinduced polarity gradient extraction. The process comprises the steps of contacting two or more suitable solvents (e.g., propane-toluene) with said residua in a liquid flooded distillation column operating in a liquid continuous mode, said solvents having a high and a low boiling point with respect to one another, said higher boiling solvent having a higher relative polarity than said lower boiling solvent and each of said boiling points being sufficiently lower than that of the residua so that the solvents are distilled into high and low polarity fractions thereby forming a low CCR maltenic overhead stream and a high CCR asphaltenic bottoms stream and thereafter recovering the solvents from the overhead stream and the bottoms stream, and recycling the solvents for reuse.

The final report for EPA Contract No. 68-02-3924 which is entitled "Pilot Plant Evaluation of Critical Fluid Extractions for Environmental Applications" discloses the results of using liquified-gas solvents in a pilot plant to extract oil from steel mill scale and bleaching clay. Two systems are described: (1) use of liquid dichlorodifluoromethane to partially extract "hydrocarbon oil" from steel mill scale, and (2) use of a non-identified solvent to remove vegetable oil (triglycerides) from bleaching clay. The report states that residual oils on both steel mill wastes and bleaching clays are soluble in liquid gas solvents such as propane.

There is a need for an efficient, economical and reliable process for separating undesirable organics from solid wastes, hazardous wastes, and the like, to render the product solids delistable or acceptable for land disposal. It would be advantageous if this process was adaptable to separating extractable organic materials from other compositions wherein such extractable organic materials are intermixed with solids and water.

SUMMARY OF THE INVENTION

This invention provides for a process for separating extractable organic material from a feed composition comprising said extractable organic material intermixed with solids and water, the process comprising the steps of: (A) contacting said feed composition with a first organic solvent, said first organic solvent being capable of dissolving at least about ten parts of said extractable organic material per million parts of said first organic solvent at the temperature wherein at least about 50% by weight of said first organic solvent boils at atmospheric pressure; dissolving at least part of said extractable organic material in said first organic solvent to form a first solution; and separating at least part of said first solution from said feed composition to provide an intermediate composition, part of said first organic solvent remaining intermixed with said intermediate composition; and (B) contacting said intermediate composition with a volatile organic solvent, said volatile organic solvent being capable of dissolving at least about ten parts of said first organic solvent per million parts of said volatile organic solvent at the temperature wherein at least about 50% by weight of said volatile organic solvent boils at atmospheric pressure; dissolving at least part of said first organic solvent in said volatile organic solvent to form a second solution; and separating said second solution from said intermediate composition to provide a treated product. In one embodiment of the invention, the feed composition and first organic solvent are maintained at a sufficient temperature during step (A) of the process to vaporize and separate out part or all of the water present in the feed composition.

DESCRIPTION OF THE PREFERRED EMBODIMENTS

Figure 1:
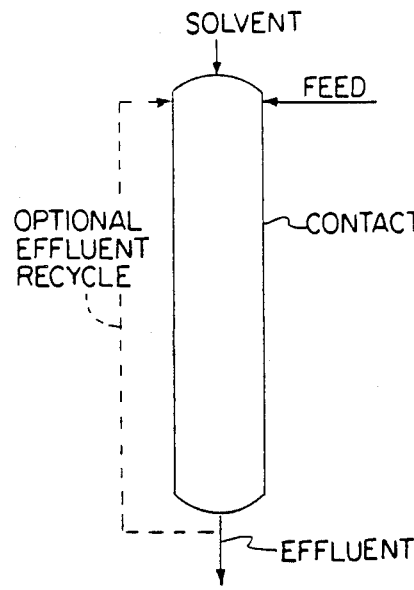
FIG. 1 is a flow sheet illustrating an embodiment of the inventive process wherein extractable organic material is separated from a feed composition comprising said extractable organic material intermixed with solids and water using a first organic solvent to extract such extractable organic material and a second volatile organic solvent to extract the first organic solvent remaining intermixed with the solids.

The feed composition that can be treated in accordance with the invention comprises an extractable organic material intermixed with solids and water. The extractable organic material is typically in a liquid state at the pressure and temperature employed in the operation of the inventive process, although part of such extractable organic material may be in a solid state at such pressure and temperature. The solids can be in any form, but in many instances are in the form of particulate solids. The solids can be porous, and in many instances these porous solids are filled with liquid (e.g., water, organic liquid). These compositions can include free water. These feed compositions typically comprise:

(i) up to about 98% by weight water;
(ii) up to about 90% by weight inorganic solids;
(iii) up to about 98% by weight organic solids;
(iv) up to about 98% by weight organic liquid;
(v) up to about 90% by weight metals and/or metal compounds; and
(vi) up to about 98% by weight four- and/or five-ring polynuclear aromatic compounds.

The term "free water" is used herein to refer to water that does not adhere to the surface of the solids of the feed composition or is not trapped within voids in such solids. When free water is present, it is preferable and in most instances necessary to separate out at least part of the free water either using conventional separation techniques (e.g., filtration, centrifugation, settling, etc.) prior to step (A) of the inventive process, or to vaporize and separate such free water during step (A). Generally at least about 20%, preferably at least about 50%, more preferably at least about 90% of the free water is separated out. When vaporization during step (A) is used to separate out free water, optionally part or all of the remaining water in the feed composition can also be separated.

The feed compositions that can be treated include solid waste and/or hazardous waste, including petroleum waste, refinery sludge and production sludge. The term "solid waste" refers to any garbage, sludge or other waste material not excluded by EPA definitions. The term "hazardous waste" refers to solid waste or combinations of solid waste which are "listed" by the EPA as hazardous, or which exhibit ignitability, corrosivity or reactivity, or are considered toxic pursuant to relevant governmental rules or regulations. The term "petroleum waste" refers to any waste material containing petroleum or hydrocarbon oil intermixed with solids and water. The term "refinery sludge" refers to sludges generated in petroleum refinery operations that contain petroleum or hydrocarbon oils intermixed with solids and water; these sludges usually contain heavy residual organics such as asphaltenes. The term "production sludge" refers to sludges generated at the well head of an oil well; these sludges typically contain oil, water, bitumen, tar sand, dirt, clay, pipe scale, drilling residues, and the like.

The feed compositions that can be treated also include oil-contaminated catalyst fines (a refinery by-product), oil-contaminated drill cuttings (an oil well drilling by-product), oil-contaminated mill scale (a steel mill by-product), oil-contaminated filter aids (e.g., clays, lime, diatomaceous earth), oil-contaminated bleaching clay (a vegetable oil filtering media), and the like. A specific example of the oil-contaminated catalyst fines that can be treated are the fines in decanter oil streams from fluid catalytic cracking units. These feed compositions also include seeds (e.g., cotton seeds), soybeans, corn and the like. The process is useful in cleaning filter beds, contaminated soil (e.g., tank truck spills, drainage ditch bottoms), etc. The process can be used to separate bitumen from tar sands.

The first organic solvent used in the inventive process is preferably capable of dissolving at least about 10 parts of the extractable organic material in the feed composition being treated per million parts of said first organic solvent at the temperature wherein at least about 50% by weight of said first organic solvent boils at atmospheric pressure. This solvent is preferably selected from those organic fluids which: dissolve hydrocarbon oil and heavy residual organics such as asphaltenes at modest temperatures (e.g., in the range of about 30 to about 400° F., preferably about 200° F. to about 300° F.) and at moderate pressures (e.g., below about 500 psig); can be separated from water and such hydrocarbon oil and heavy residual organics using conventional separation techniques; and can be stripped using a volatile organic solvent in accordance with the inventive process. These solvents include aromatic compounds, cycloaliphatic compounds, aliphatic-substituted aromatic compounds, cycloaliphatic-substituted aromatic compounds, aliphatic-substituted cycloaliphatic compounds, and mixtures thereof. These compounds include substantially hydrocarbon compounds as well as purely hydrocarbon compounds. The term "substantially hydrocarbon" is used herein to mean that the compounds contain no non-hydrocarbon substituents or non-carbon atoms that significantly affect the hydrocarbon characteristics or properties of such compounds relevant to their use herein as solvents. The aromatic compounds can be mononuclear (e.g., benzene) or polynuclear (e.g., naphthalene, anthracene, etc.). The aliphatic substituents on the aromatic compounds can be straight chain hydrocarbon groups of 1 to about 3 carbons, cyclic groups of about 3 to about 6 carbons, or mixtures thereof. The aromatic compounds can be mono-substituted or poly-substituted. The poly-substituted aromatic compounds are preferably di-substituted. Examples include toluene, the xylenes, ethyl benzene, cyclohexyl benzene, etc. The cycloaliphatic compounds can have from about 3 to about 6 ring carbon atoms, preferably 5 or 6 ring carbon atoms, and can be saturated or unsaturated. Examples include cyclopropane, cyclobutane, cyclopentane, cyclopentene, 1,3-cyclopentadiene, cyclohexane, cyclohexene, 1,3-cyclohexadiene, etc. The aliphatic substituents on the aliphatic-substituted cycloaliphatic compounds can be straight chain hydrocarbon groups of 1 to about 6 carbon atoms, preferably 1 to about 3 carbon atoms. The rings of the cycloaliphatic compounds can be mono-substituted or poly-substituted. The poly-substituted compounds are preferably di-substituted. Examples include methylcyclopentane, methylcyclohexane, 1,3-dimethylcyclohexane, 3-ethylcyclopentene, 3,5-dimethylcyclopentene, etc. Ethers such as methyl tertiary butyl ether are useful.

The first organic solvent generally has an initial boiling point in the range of about 0° F. to about 500° F., and a final boiling point in the range of about 200° F. to about 1000° F. at atmospheric pressure. These solvents can have an aromatic content in excess of about 25% by weight, and in many instances they have an aromatic content in excess of about 50% by weight. In one embodiment, this solvent has an initial boiling point in the range of about 50° F. to about 150° F., and a final boiling point in the range of about 200° F. to about 300° F. In another embodiment, this solvent has an initial boiling point in the range of about 180° F. to about 280° F., and a final boiling point in the range of about 325° F. to about 425° F. In another embodiment, this solvent has an initial boiling point in the range of about 200° F. to about 325° F., and a final boiling point in the range of about 425° F. to about 525° F. In another embodiment, this solvent has an initial boiling point in the range of about 300° F. to about 500° F., and a final boiling point in the range of about 650° F. to about 850° F. In one embodiment, at least about 50% by weight, more preferably at least about 75% by weight, more preferably at least about 90% by weight, of this solvent boils at a temperature below about 750° F. at atmospheric pressure, and all or substantially all of said solvent boils at a temperature below about 1000° F. at atmospheric pressure. A useful solvent has an initial boiling point in the range of about 200° F. to about 325° F., preferably about 260° F. to about 290° F., a 90% by weight boiling point in the range of about 350° F. to about 450° F., preferably about 380° F. to about 420° F. (that is, 90% by weight of the solvent boils at a temperature below about 350° F. to about 450° F. at atmospheric pressure), and a final boiling point in the range of about 425° F. to about 525° F., preferably about 460° F. to about 490° F.; this solvent preferably contains in excess of about 50% by weight aromatics, more preferably in excess of about 75% by weight aromatics, more preferably in excess of about 90% by weight aromatics. Another useful solvent has an initial boiling point in the range of about 300° F. to about 500° F., preferably about 360° F. to about 420° F., a final boiling point in the range of about 650° F. to about 850° F., preferably about 720° F. to about 780° F.; this solvent preferably has an aromatics content of in excess of about 50% by volume, preferably in the range of about 50% to about 90% by volume, more preferably about 60% to about 80% by volume.

The first organic solvent can be an aromatic or aromatic-rich fluid that is readily available from a refinery system such as, for example, one or more reformates (e.g., light reformate, heavy reformate, etc.) that are produced by reformers in a typical refinery system. A typical light reformate fluid has an initial boiling point of about 70° F., a final boiling point of about 245° F., and contains benzene and toluene. A typical heavy reformate has an initial boiling point of about 230° F., a final boiling point of about 375° F., and contains toluene, ethylbenzene, o-xylene and p-xylene.

The first organic solvent can be a middle distillate such as fuel oil (e.g., straight run distillates, diesel oil, etc.), kerosene, and the like.

The volatile organic solvent is preferably capable of dissolving at least about 10 parts of the above-discussed first organic solvent per million parts of said volatile organic solvent at the temperature wherein at least about 50% by weight of said volatile organic solvent boils at atmospheric pressure. This solvent preferably has a sufficiently low viscosity so that at economical flow rates unmanageable pressure drops are not experienced when the solids composition being treated is in the form of a fixed bed of solids, or excessive entrainments are not experienced when such solids composition is in the form of an agitated or fluidized bed of solids. This solvent is preferably economically recoverable from the treated product solids once the inventive process has been completed. Preferred volatile organic solvents include aliphatic, aromatic and cycloaliphatic hydrocarbons having from 2 to about 9 carbon atoms, preferably from 3 to about 5 carbon atoms; halohydrocarbons of from 1 to about 9 carbon atoms, preferably 1 to about 5 carbon atoms, more preferably 1 to about 3 carbon atoms; and mixtures of two or more of any of the foregoing. Examples of such solvents include propane, cyclopropane, propylene, n-butane, isobutane, cyclobutane, butene (e.g., butene-1, cis-butene-2, trans-butene-2), butadiene (e.g., 1,3-butadiene), isobutylene, n-pentane, isopentane, neopentane, cyclopentane, pentene (e.g., pentene-1, cis-pentene-2, etc.), cyclopentene, pentadiene (e.g., 1,3-pentadiene, etc.), cyclopentadiene, cyclohexane, cyclohexene, cyclohexadiene, methylene chloride, dichlorodifluoromethane, trichlorofluoromethane, cloroethane, trichloroethane, dichlorotetrafluoroethane, trichloroethylene, tetrafluoroethylene, chloropropane, chlorobutane, chloropentane, dichloropentane, and mixtures of two or more thereof. Also useful are aromatic compounds such as benzene, toluene and the xylenes. This solvent can be a mixture made up primarily of hydrocarbon compounds or substantially hydrocarbon compounds of from about 5 to about 7 carbon atoms (e.g., gas well condensates comprising hydrocarbons of from about 5 to about 7 carbon atoms). Liquified petroleum gas (LPG) is useful. Examples of commercial grades of LPG include Commercial Propane, Commercial Butane, Commercial Propane-Butane Mixtures, Special Duty Propane and Propane HD-5. Mixtures of two or more of the foregoing solvents can be used.

The feed composition to be treated is preferably pretreated to remove some of the water and organic liquid (e.g., oil) prior to treatment in accordance with the inventive process. In this pretreating step, pretreatment units that are particularly useful include vacuum filters, belt presses, filter presses or a combination of the foregoing, the design of which are entirely conventional. A dryer to further de-water the feed composition can be used. The pretreated feed composition coming off the pretreatment units can be placed in holding bins.

The feed composition produced by the pretreatment units are conveyed to the contacting vessel. Conveyance to the contacting vessel can be by conveyor belt, screw conveyor, pneumatic equipment, in slurry form, in bags or baskets which are lowered into the contacting vessel, or by any other conventional means known in the art. A suitably designed gasketed filter press can serve as both the pretreatment unit and the contacting unit.

In an optional step, the pre-treated feed composition can be mixed with one or more filter aids to facilitate the formation of and/or insure the retention of a fluid-permeable mass or bed of solids. The filter aids that are useful are preferably selected from those materials having relatively low bulk densities when compared to the feed composition and a structural integrity that does not degrade significantly when in contact with the organic material intermixed with the solids in the feed composition or the solvents used in accordance with the inventive method. These filter aids also preferably do not contain significant levels of EPA listed materials. Examples of filter aids that are useful include inorganic materials such as diatomaceous earth, vermiculite, perlite, excelsior, pumice and the like; organic materials such as saw dust, wood chips, straw, ground tree bark, ground corn cobs, de-oiled rice bran and the like; and synthetic polymeric materials such as porous polypropylene beads, blown plastics (especially off-specification blown plastics) and the like. Polyelectrolyte polymer flocculating agents are also useful. Mixtures of two or more of the foregoing filter aids can be used. The level of addition of filter aid to the feed composition is typically in the range of zero to about 500% by weight, preferably zero to about 200% by weight, more preferably zero to about 150% by weight, more preferably about 50% to about 100% by weight based on the weight of the dry solids in the feed composition. This optional step of mixing the feed composition with a filter aid can be effected in the pre-treatment unit or in the contactor using conventional mixing techniques.

The contacting unit can be one or more pressurized vessels that may be operated in a batch mode, semi-batch mode or in a continuous mode. The contactor unit can be operated in a mixer-settler mode. That is, the feed composition and solvent are mixed and allowed to settle, liquid is decanted off the top, more solvent is added, and then the sequence is repeated. When multiple vessels are employed the vessels can be operated in parallel or in staggered sequence. Multiple vessels can be arranged in a cascade wherein effluent extracted from one vessel that contains a relatively low concentration of extractable organic material can be used as the solvent in one or more other vessels. The configuration of the vessel is dependent upon the means of conveyance of the feed composition to the vessel and the treated product from the vessel. For example, if the feed composition is conveyed to the vessel in slurry form, nozzles with ball valves or pinch valves can satisfactorily seal the vessel. If the feed composition is conveyed by large bag or basket, large diameter hatch closures can be used to satisfactorily provide closure of the vessel. For pneumatic conveyance of the treated product solids from the vessels, conventional designs including coneshaped bottoms with manifolds of air-jet nozzles can be used. Continuous systems employing lock-hoppers or rotary valves can be used. The treated product solids can also be conveyed from the contacting vessel by slurrying the solids with water followed by an appropriate de-watering step using, for example, vacuum drum filters, clarifiers, settling tanks, centrifuges, sludge dryers and the like. The treated product solids can also be conveyed from the contacting vessel by slurrying them in a light hydrocarbon liquid of, for example, from about 3 to about 5 carbon atoms (e.g., propane, butane, pentane, etc.) and then transferring the slurry to a low pressure lock hopper. The hydrocarbon liquid is thereafter separated from the solids using conventional techniques (e.g., flashing, steam stripping, etc.). The contacting vessels can employ mechanical agitators, and heating/cooling jackets as well as external thermal insulation.

The direction of flow of the solvents used in the inventive method through the solids of the feed composition can be upwardly, downwardly or radially or it can alternate between any of the foregoing. While not wishing to be bound by theory, it is believed that the mechanism by which the solvents effect separation of the extractable organic material from the solids of the feed composition involves (1) a sweeping action wherein the solvent advances through the feed composition and displaces the organic material intermixed therein and (2) an extraction wherein the extractable organic material dissolves or disperses in the solvent and is carried away from the solids with such solvent.

The contactor vessel effluent of extractable organic material and solvent can be disposed of directly (e.g., in the case wherein the feed composition being treated is a refinery sludge, the effluent can be combined with an appropriate refinery stream) or the effluent can be treated to separate the extractable organic material from the solvent. The solvent can then be recycled. Separation can be accomplished by a number of means discussed in greater detail below including flashing and distillation.

One method for recycling the solvents with higher viscosities involves using a pump and a heater to pump the solvent through the contacting vessel until the desired bed temperature is reached. A heated storage tank is employed to store the contacting vessel fluid effluent. A continuous flash/distillation system can be used to separate the solvents from the undesirable extracted organic materials. A cooler and separator can be used to separate water from the solvent.

The contacting vessel is filled with the feed composition conveyed from the pretreatment unit. In applications wherein a slurry fill is used, the excess slurry solvent may be drained down. With other filling methods, an inert gas purge can be used. The contacting vessel is then pressurized to the desired operating pressure. It will be understood, however, that either or both steps (A) and (B) of the inventive process can be operated at atmospheric pressure.

Step (A) of the process is effected by introducing the first organic solvent into the contactor and intermixing it with the feed composition for an effective period of time to extract a desired amount of the extractable organic material from said feed composition and thus form a first solution of said extractable organic material and said solvent. The temperature within the contactor during this step of the process is preferably in the range of about 0° F. to about 800° F., more preferably about 50° F. to about 300° F., more preferably about 150° F. to about 250° F. The pressure within the contactor during this step of the process is preferably in the range of about atmospheric pressure to about 500 psig, more preferably in the range of about atmospheric pressure to about 300 psig, more preferably in the range of about atmospheric pressure to about 150 psig, more preferably about atmospheric pressure to about 100 psig, more preferably about atmospheric pressure to about 50 psig. The average contact time between the first organic solvent and the solids of feed composition is preferably in the range of about 0.01 minute to about 100 hours, more preferably in the range of about 1 second to about 8 hours, more preferably in the range of about 1 second to about 1 hour. When the feed composition is in the form of a bed of particulate solids, the first organic solvent is preferably advanced through the solids at a sufficient rate to expand the bed, or to fluidize the bed. The temperature and pressure are set at levels so that preferably at least about 30% by weight, more preferably at least about 50% by weight, more preferably at least about 70% by weight, more preferably at least about 90% by weight of the first organic solvent is in a condensed state. During this step of the process, mechanical means are preferably employed to agitate the mixture of feed composition and solvent. Conventional techniques such as the use of static or non-static mixers, simple mixers, and recirculating pumps can be used. The solution of extractable organic material and solvent is preferably separated from the solids of the feed composition using mechanical separation means such as filtration, centrifugation, hydrocycloning or settling. Typically, at least part of the water present in the feed composition remains intermixed with the solids during this step of the process.

In one embodiment of the invention, the feed composition and the first organic solvent are maintained at a sufficiently high temperature during step (A) to vaporize water and separate it from the feed composition. In this embodiment, sufficient heat and contact time are preferably employed to vaporize and separate all or substantially all of the water in the feed composition. This procedure is particularly useful when the feed composition contains free water. In this regard, feed compositions having a free-water content in excess of 5%, 10%, 20% and greater can be treated in accordance with this procedure. When this procedure is employed, it is preferable that the first solvent has an initial boiling point above the boiling point of water, although solvents can be used wherein at least about 50% by weight, more preferably at least about 70% by weight, more preferably at least about 90% by weight of such solvent, boil at a temperature in excess of the boiling point of water. Heat may be supplied directly through steam coils or by the introduction of live steam into the mixture. Heat may also be supplied through external heating of the solvent or by recycling the solvent through a heat exchanger. Alternative methods of dehydration such as direct steaming, hot-air drying, etc., can be used. While not wishing to be bound by theory, it is believed that in using this procedure the first organic solvent acts not only as an extractant, but also as a heat-transfer medium. Removal of the vaporized water from the sludge increases the porosity and modifies the surface behavior of the solids, and enhances contact of the first solvent with the heavy residual organics in the feed composition. During and/or after vaporization of the water, the solution formed by dissolving extracted organic material in the solvent can be removed from the solids using conventional mechanical separation techniques such as decanting, settling, filtration, centrifugation, etc.

Step (A) of the inventive process can be repeated with additional solvent extractions until desired levels of extraction have been achieved. With subsequent extractions the same or different solvents can be used, and the same or different operating parameters (e.g., temperature, pressure, etc.) can be used.

Step (A) of the inventive process is conducted until all or substantially all of the extractable organic materials (e.g., hydrocarbon oils and heavy residual organics such as asphaltenes) have been removed from the solids or reduced to acceptable limits. The resulting product from this first step is an intermediate composition which comprises the solids intermixed with solvent. If the vaporization technique discussed above is used, part or all of the water present in the original feed composition is removed during step (A). If this vaporization technique is not used, most or all of the water present in the original feed composition is also intermixed with the solids in the intermediate composition.

Step (B) of the process is used to extract the solvent from step (A) that remains intermixed with the solids. The temperature within the contactor during this step of the process is preferably in the range of about 0° F. to about 500° F., more preferably about 0° F. to about 300° F., more preferably about 0° F. to about 150° F. The pressure within the contactor during this step of the process is preferably in the range of atmospheric pressure to about 1000 psig, more preferably in the range of atmospheric pressure to about 500 psig, more preferably in the range of atmospheric pressure to about 300 psig. The average contact time between the volatile organic solvent and the solids is preferably in the range of about 0.01 minute to about 100 hours, more preferably about 1 second to about 8 hours, more preferably about 1 second to about 1 hour. The volatile organic solvent can be advanced through the particulate solids at a sufficient rate to expand the bed when the particulate solids are in the form of a fixed bed, or to fluidize the bed when the particulate solids are in the form of an agitated or fluidized bed. The temperature, pressure and flow rate of the volatile organic solvent are set at levels so that preferably at least about 30% by weight, more preferably at least about 50% by weight, more preferably at least about 70% by weight, more preferably at least about 90% by weight of the solvent is in a condensed state. When in such a condensed state, this solvent preferably has a density in excess of about 15 pounds per cubic foot, more preferably in excess of about 20 pounds per cubic foot, more preferably in excess of about 25 pounds per cubic foot. When the solvent is propane, the upper limit is preferably about 33 pounds per cubic foot. When the solvent is butane, the upper limit is preferably in the range of about 35 to about 40 pounds per cubic foot. The flow of the volatile organic solvent through the solids is continued until a desired amount of the first organic solvent is extracted from the solids. During this step of the process, mechanical means are preferably employed to agitate the mixture of solids and volatile organic solvent. Conventional techniques such as the use of non-static mixers, simple mixers, and recirculating pumps can be used. The solution of first organic solvent and volatile organic solvent can be separated from the solids using a number of conventional techniques such as filtration, steam stripping, etc. This solution can be separated by displacement with water or an inert gas or by draining the solution from the contactor vessel prior to depressurizing the vessel. Step (B) is conducted until all of the first organic solvent is extracted from the solids, or until the concentration of said first organic solvent is reduced to acceptable levels. Any volatile organic solvent remaining intermixed with the solids can be separated therefrom using conventional procedures (e.g., steam stripping, flashing, drying, etc.). The solids are then removed from the contactor vessel using the techniques discussed above. If the water was not previously removed from the solids using the vaporization procedure discussed above, such water can be removed by any conventional means such as filtration, centrifugation, etc. The solids can then be disposed of using conventional solids disposal techniques.

Step (B) of the inventive process is continued until the first organic solvent has been removed from the solids or until the level of such first organic solvent is reduced to an acceptable level. If the level of first solvent intermixed with the solids is not reduced to an acceptable level, subsequent repetitions of step (B) can be conducted. With subsequent extractions, the same or different volatile organic solvent can be used, and the same or different operating parameters (e.g., temperature, pressure, flow rate, etc.) can be used.

The resulting treated product produced from step (B) of the inventive process comprises primarily the solids from the original feed composition intermixed with water. If the vaporization technique discussed above is used during step (A) of the process, the resulting treated product is a de-watered or relatively dry solids product. If the level of extractable organic materials (e.g., heavy residual organics such as asphaltenes) is not reduced to acceptable levels, the solids can be treated with subsequent extractions using both steps (A) and (B) of the process. With such subsequent extractions, the same or different solvents and the same or different operating parameters used with the initial extractions can be used.

In the event undesirable metals or metal compounds are intermixed with the treated product solids produced in accordance with the inventive method, such solids can be treated with one or more fixation chemicals to immobilize the metal or metal compound sufficiently to thereby prevent or reduce to acceptable levels subsequent leaching of the metal or metal compound from the solids. The solids can be treated with one or more fixation chemicals by mixing the solids with the fixation chemical in water at ambient temperatures. The resulting slurry can then be de-watered using conventional techniques (e.g., filtration, centrifugation, settling, etc.). Various fixation chemicals that are commercially available are useful with the inventive process. Examples of such useful fixation chemicals include commercially available silica- or silicate-bearing solutions, fly ash and sodium sulfide. Pozzalime, a product of Mineral By-Products, Inc. identified as containing about 60% CaO and 16% $SiO_2$, is a commercially available fixation chemical that is useful. The fixation chemical is typically blended with the solids at levels of up to about 100% by weight based on the weight of said solids, preferably from about 10 to about 50% by weight based on the weight of said solids.

Figure 7:
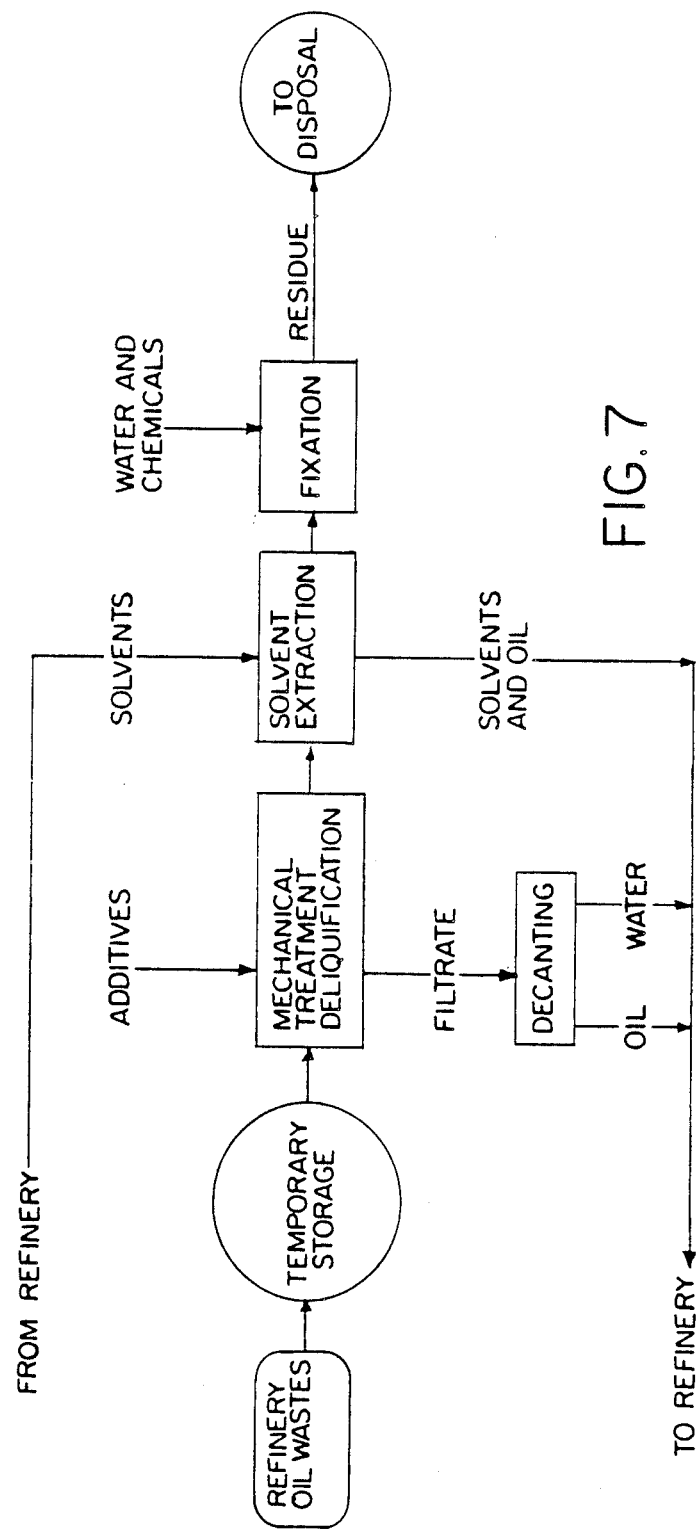
FIG. 7 is a flow sheet illustrating a refinery sludge treatment process wherein the inventive process is used in combination with mechanical treatment for volume reduction and chemical fixation for metal constituent immobilization.

In order to further illustrate the inventive process, reference is made to the drawings wherein various embodiments of the inventive process are illustrated. With the exception of the embodiment illustrated in FIG. 7, any of the feed compositions discussed above can be treated with each of the illustrated embodiments. FIG. 7 relates to the treatment of refinery sludge. The solvents and operating parameters discussed above are used with these illustrated embodiments.

FIG. 1 is a flow sheet illustrating an embodiment of the inventive process wherein separation of the extracted organic materials (e.g., hydrocarbon oil, heavy residual organics) from the solvents, and separation of the solvents used in steps (A) and (B) from each other is not required. This embodiment is useful for treating, for example, a refinery sludge, wherein the effluent stream of extracted organic materials and solvents are returned directly to the refinery system for further use and/or treatment. The contactor vessel is equipped with agitation means (e.g., non-static mixer, simple mixer, recirculating pump, etc.) to mix the contactor vessel contents during both steps (A) and (B) of the inventive process. Agitation is optional, but preferable, and when used can be used on a continuous or an intermittent basis. The feed composition is preferably pretreated as discussed above and the resulting partially de-oiled and de-watered solids are placed in the contactor vessel. The first organic solvent is introduced into the contactor vessel during step (A) of the inventive process and advanced downwardly through the solids. The downward flow of the first organic solvent through the solids dissolves the extractable organic materials that are intermixed with the solids and displaces the resulting solution downwardly to and through an outlet in the bottom of the contactor vessel. The effluent from the contactor, which comprises a mixture of separated extracted organic material and the first organic solvent, can be disposed of or, for example, in the treatment of a refinery sludge returned to an appropriate location in the refinery system (e.g., the crude tower) for further processing. If the concentration level of extractable organic materials in the effluent is relatively low, the effluent can be recycled. Step (A) is continued until all or substantially all of the extractable organic materials are completely removed, or their concentration is reduced to acceptable levels. At the end of step (A) of the inventive process, the resulting intermediate composition remaining in the contactor vessel comprises the solids with some of the first organic solvent remaining intermixed therewith. Most of the water that was intermixed with the pretreated solids at the beginning of step (A) also remains intermixed with the solids. Step (B) of the inventive process is commenced by advancing the volatile organic solvent downwardly through the solids. The volatile organic solvent dissolves the first solvent, and displaces the resulting second solution downwardly through the contactor vessel to and through the outlet. This effluent can be disposed of, or in the case wherein a refinery sludge is being treated, said effluent can be returned to an appropriate location in the refinery system. If the concentration of first organic solvent in this effluent is relatively low, this effluent can be recycled. Step (B) is continued until all or substantially all of the first organic solvent is extracted from the solids. At the end of step (B), most of the water that was intermixed with the solids remains intermixed. This water can be separated from the solids using conventional techniques (e.g., filtration, centrifugation, settling, etc.). The volatile organic solvent remaining intermixed with the solids is separated from the solids by any of a number of conventional techniques including displacing the volatile organic solvent with water or an inert gas, drying the solids, etc. The solids, are disposed of using conventional solids disposal techniques (e.g., landfill, etc.).

Figure 2:
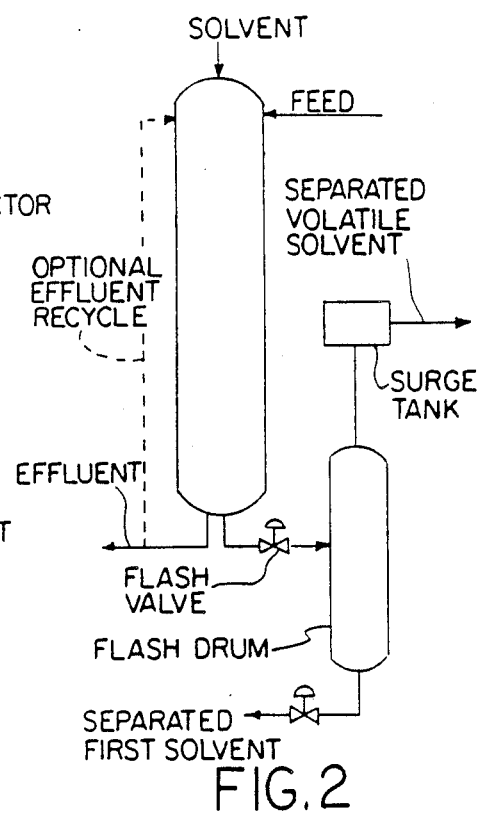
FIG. 2 is a flow sheet illustrating the process of FIG. 1 wherein flashing is used to separate the volatile organic solvent from the first organic solvent.

FIG. 2 is a flow sheet illustrating the operation of the inventive process using a contactor vessel, flash valve, flash drum and surge tank. The contactor vessel is equipped with agitation means (e.g., nonstatic mixer, simple mixer, recirculating pump, etc.) to mix the solids and solvent during both steps (A) and (B) of the inventive process. Agitation is optional, but preferable, and when used can be used on a continuous or an intermittent basis. The feed composition to be treated is preferably pretreated as discussed above and the resulting partially de-oiled and de-watered solids are placed in the contactor vessel. The first organic solvent is introduced into the contactor vessel during step (A) of the inventive process and advanced downwardly through the solids. The downward flow of the first organic solvent dissolves the extractable organic materials intermixed with the solids and displaces the resulting first solution downwardly through the contactor vessel to and through an outlet in the bottom of the contactor vessel. This effluent can be further treated according to known techniques, or in the case wherein the feed composition is a refinery sludge the effluent can be returned to an appropriate unit in the refinery system. If the concentration of extractable organic material in this effluent is relatively low, the effluent can be recycled through the contactor vessel. Step (A) is continued until all or substantially of the extractable organic materials (e.g., hydrocarbon oil and heavy residual organics such as asphaltenes) are completely extracted from the solids or reduced to acceptable levels. At the end of step (A), the resulting intermediate composition remaining in the contactor vessel comprises the solids with some of the first organic solvent remaining intermixed therewith. Most of the water that was intermixed with the pretreated solids at the beginning of step (A) also remains intermixed with the solids. Step (B) of the inventive process is commenced by introducing the volatile organic solvent into the contactor vessel. The volatile organic solvent is advanced downwardly through the solids, dissolves the first solvent remaining intermixed with the solids, and displaces the resulting second solution downwardly through the contactor vessel to an outlet in the contactor and then through a conduit to the flash valve. The flash valve is opened to permit the flow of the second solution to the flash drum. In the flash drum the volatile organic solvent flashes and separates from the first organic solvent. The separated first organic solvent is removed from flash drum and is available for further use in accordance with the inventive method. The volatile organic solvent is advanced to the surge tank where it is collected and is available for further use in accordance with the inventive method. The volatile organic solvent can be recycled to the contactor vessel. Step (B) is continued until all or substantially all of the first organic solvent is extracted from the solids. Upon completion of step (B), most of the water remains intermixed with the solids. This water can be separated using conventional techniques (e.g., filtration, centrifugation, settling, etc.). The volatile organic solvent remaining intermixed with the solids is separated from the solids by any of a number of conventional techniques including displacing the volatile organic solvent with water or an inert gas, drying the solids, etc. The solids are disposed of using conventional solids disposal techniques.

Figure 3:
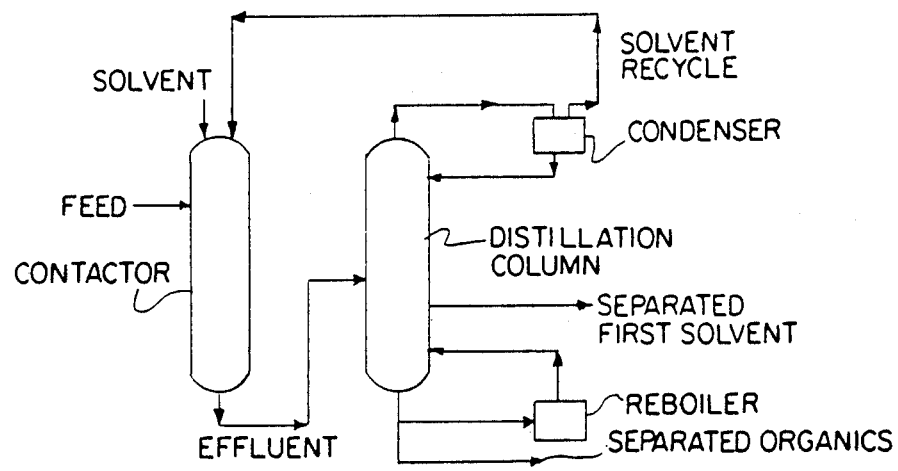
FIG. 3 is a flow sheet illustrating the process of FIG. 1 wherein distillation is used to separate the first organic solvent from the extractable organic material and to separate the solvents from each other.

FIG. 3 is a flow sheet illustrating the operation of the inventive process using a contactor and a distillation column. The contactor vessel is equipped with agitation means (e.g., non-static mixer, simple mixer, recirculating pump, etc.) to mix the solids and solvent during both steps (A) and (B) of the inventive process. Agitation is optional, but preferable, and when used can be used on a continuous or an intermittent basis. The feed composition to be treated is preferably pretreated as discussed above and the resulting partially de-oiled and de-watered solids are placed in the contactor vessel. The first organic solvent is introduced into the contactor vessel during step (A) of the inventive process and is advanced downwardly through the solids. The downward flow of first organic solvent through the solids dissolves the extractable organic materials that are intermixed with the solids and displaces the resulting first solution downwardly through the contactor vessel to and through an outlet in the bottom of the contactor vessel. This effluent is advanced through a conduit to the distillation column. The extractable organic materials and first organic solvent in the effluent are separated from each other in the distillation column using conventional distillation techniques. The first organic solvent that emerges from the distillation column can be recycled to the contactor. The separated extractable organics that emerge from the distillation column are recovered for disposal or further processing. In the case wherein the feed composition is a refinery sludge, the separated extractable organics, which would typically comprise a mixture of hydrocarbon oil and heavy residual organics, can be advanced to the refinery system for further processing. Step (A) is continued until all or substantially all of the extractable organic materials are completely extracted from the solids or reduced to acceptable levels. At the end of step (A), the resulting intermediate composition remaining in the contactor vessel comprises the solids with some of the first organic solvent remaining intermixed therewith. Most of the water that was intermixed with the pretreated solids at the beginning of step (A) also remains intermixed with the solids. Step (B) of the inventive process is commenced by introducing the volatile organic solvent into the contactor vessel. The volatile organic solvent is advanced downwardly through the solids, dissolves the remaining first solvent, and displaces the resulting second solution downwardly through the contactor vessel to the distillation column wherein the first organic solvent and volatile organic solvent are separated. This process is continued until the desired level of extraction of the first organic solvent has been achieved. The volatile organic solvent can be recycled. The separated first organic solvent can be recovered for further use in accordance with the inventive process. Step (B) is continued until all or substantially all of the first organic solvent is extracted from the solids. Upon completion of step (B), most of the water remains intermixed with the solids. This water can be separated using conventional techniques (e.g., filtration, centrifugation, settling, etc.). The volatile organic solvent remaining intermixed with the solids is separated from the solids by any of a number of conventional techniques including displacing the volatile organic solvent with water or an inert gas, drying the solids, etc. The solids are disposed of using conventional solids disposal techniques.

Figure 4:
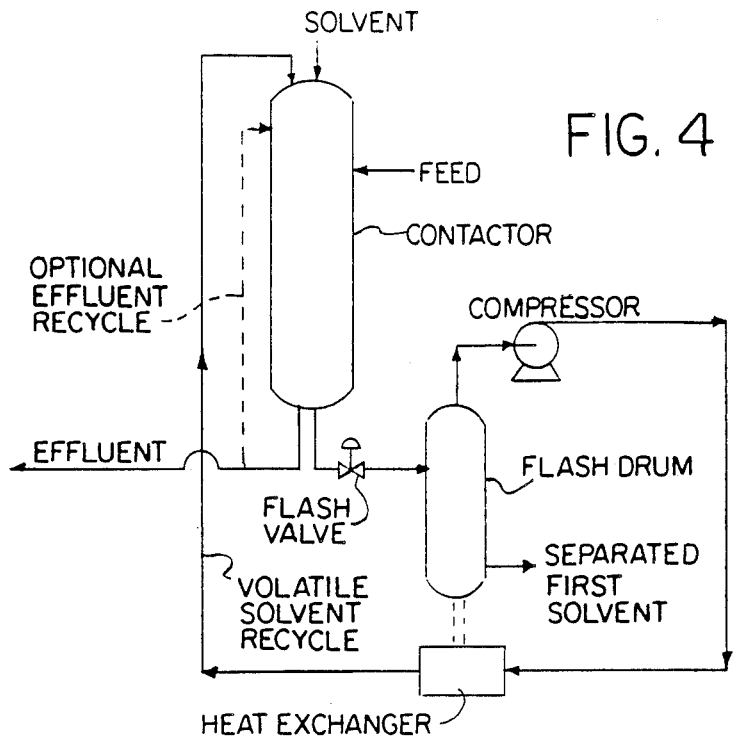
FIG. 4 is a flow sheet illustrating the process of FIG. 1 wherein flashing and vapor compression are used to separate the volatile organic solvent from the first organic solvent and to recycle the volatile organic solvent.

FIG. 4 is a flow sheet illustrating the operation of the inventive process using a contactor vessel, flash drum, compressor and heat exchanger. The contactor vessel is equipped with agitation means (e.g., nonstatic mixer, simple mixer, recirculating pump, etc.) to mix the contactor vessel contents during both steps (A) and (B) of the inventive process. Agitation is optional, but preferable, and when used can be used on a continuous or an intermittent basis. The feed composition to be treated is preferably pretreated as discussed above and the resulting partially de-oiled and de-watered solids are placed in the contactor vessel. The first organic solvent is introduced into the contactor vessel during step (A) of the inventive process and is advanced downwardly through the solids. The downward flow of the first organic solvent through the solids dissolves the extractable organic materials that are intermixed with the solids and displaces the resulting first solution downwardly through the contactor vessel to and through an opening in the bottom of the contactor vessel. The first solution which emerges as the effluent can be disposed of or treated further using conventional techniques. If the concentration of extractable organic materials in the effluent is relatively low, the effluent can be recycled to the contactor vessel. Step (A) is continued until all or substantially all of the extractable organic materials (e.g., hydrocarbon oil and heavy residual organics such as asphaltenes) are completely extracted from the solids or until their concentration is reduced to acceptable levels. At the end of step (A), the resulting intermediate composition remaining in the contactor vessel comprises the solids with some of the first organic solvent remaining intermixed therewith. Most of the water that was intermixed with the pretreated solids at the beginning of step (A) also remains intermixed with the solids. Step (B) of the inventive process is commenced by introducing the volatile organic solvent into the contactor vessel. The volatile organic solvent is advanced downwardly through the solids, dissolves the remaining first solvent, and displaces the resulting second solution downwardly through the contactor vessel to an opening in the contactor and then through a conduit to the flash valve. The second solution that is advanced to the flash valve comprises a mixture of the first organic solvent and the volatile organic solvent. Most of the water that is intermixed with the solids remains behind in the contactor vessel with the solids. The flash valve is opened to permit the flow of the second solution to the flash drum. In the flash drum, the volatile organic solvent flashes and separates from the first organic solvent. The first organic solvent is removed from the flash drum and stored for further use in accordance with the inventive process. The volatile organic solvent vaporizes in the flash drum, and is advanced through a conduit to the compressor wherein it is compressed. The compressed solvent is advanced to and through the heat exchanger and then back to the contactor. In the heat exchanger, heat is transferred from the volatile organic solvent to the flash drum. Step (B) is continued until all or substantially all of the first organic solvent is extracted from the solids. Upon completion of step (B), most of the water in the original pretreated feed composition remains intermixed with the solids. This water can be separated from the solids using conventional techniques (e.g., filtration, centrifugation, settling, etc.).

The volatile organic solvent remaining intermixed with the solids is separated from the solids by any of a number of conventional techniques including displacing the volatile organic solvent with water or an inert gas, drying the solids, etc. The solids are disposed of using conventional solids disposal techniques.

Figure 5:
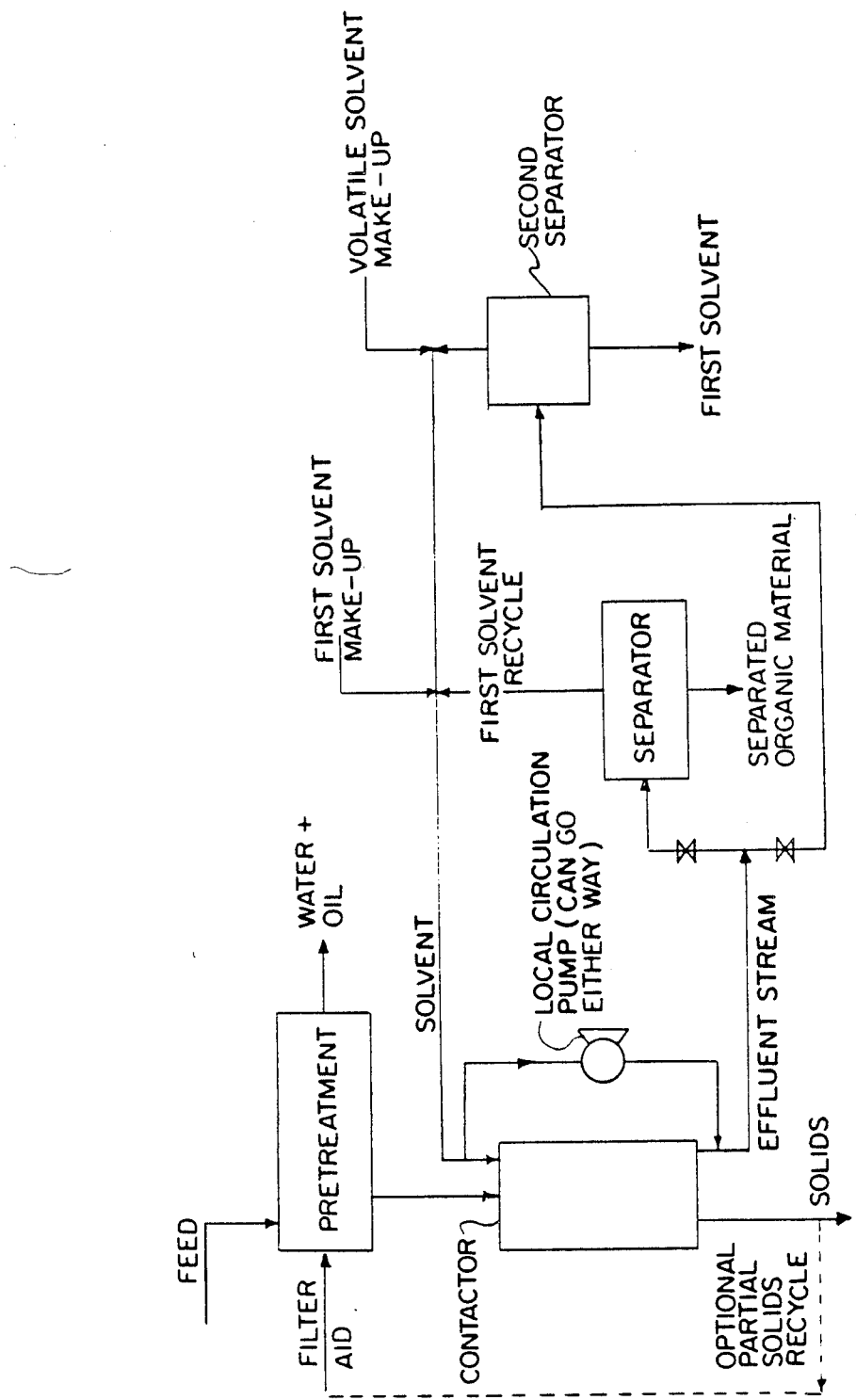
FIG. 5 is a flow sheet illustrating the process of FIG. 1 wherein the feed composition is partially dewatered and de-oiled, and the solvents are separated and recycled.

FIG. 5 is a process flow sheet illustrating an embodiment of the invention wherein a pretreatment unit, contactor, separator and second separator are used. The contactor vessel is equipped with agitation means (e.g., non-static mixer, simple mixer, recirculating pump, etc.) to mix the solids and solvent during both steps (A) and (B) of the inventive process. Agitation is optional, but preferred, and when used can be used on a continuous or an intermittent basis. The feed composition is advanced to the pretreatment unit wherein water and oil are partially removed. A conventional filter aid (e.g., clay, lime, diatomaceous earth, etc.) is preferably used to enhance the separation. Partially de-watered and de-oiled solids are advanced to the contactor from the pretreatment unit. The first organic solvent is introduced into the contactor vessel during step (A) of the inventive process and advanced downwardly through the solids. The downward flow of the first organic solvent dissolves the extractable organic materials intermixed with the solids and displaces the resulting first solution downwardly through the contactor vessel to and through an outlet in the bottom of the contactor vessel where it emerges from the contactor as an effluent stream. This effluent stream is advanced to the separator wherein the extracted organic materials are separated from the first organic solvent intermixed therewith using conventional techniques (e.g., distillation). The separated first organic solvent can be recycled to the contactor. Additional solvent make-up can be added to the recycled solvent. Step (A) is continued until all or substantially all of the extractable organic materials are completely extracted from the solids or reduced to acceptable levels. At the end of step (A), the resulting intermediate composition remaining in the contactor vessel comprises the solids with some of the first organic solvent remaining intermixed therewith. Most of the water that was intermixed with the pretreated solids at the beginning of step (A) also remains intermixed with the solids. Step (B) of the inventive process is commenced by introducing the volatile organic solvent into the contactor vessel. The volatile organic solvent is advanced downwardly through the solids, dissolves the remaining first organic solvent, and displaces the resulting second solution downwardly through the contactor vessel to an outlet in the contactor. The second solution is advanced to the second separator wherein the volatile organic solvent and the first organic solvent are separated using conventional techniques. The volatile organic solvent can be recycled to the contactor. Additional solvent make-up can be added to the recycled volatile solvent. The separated first organic solvent can be stored for future use. Upon completion of step (B), water remaining intermixed with the solids can be disposed of using conventional techniques (e.g., filtration, centrifugation, settling, etc.). The volatile organic solvent remaining intermixed with the solids is separated from the solids by any of a number of conventional techniques including displacing the volatile organic solvent with water or an inert gas, drying the solids, etc. The process also provides for a local fluid pump-around that can be optionally used prior to either of steps (A) or (B) of the process, and/or recycling of the solids to increase the degree of separation of extractable organic materials from the solids. The solids are disposed of using conventional solids disposal techniques.

Figure 6:
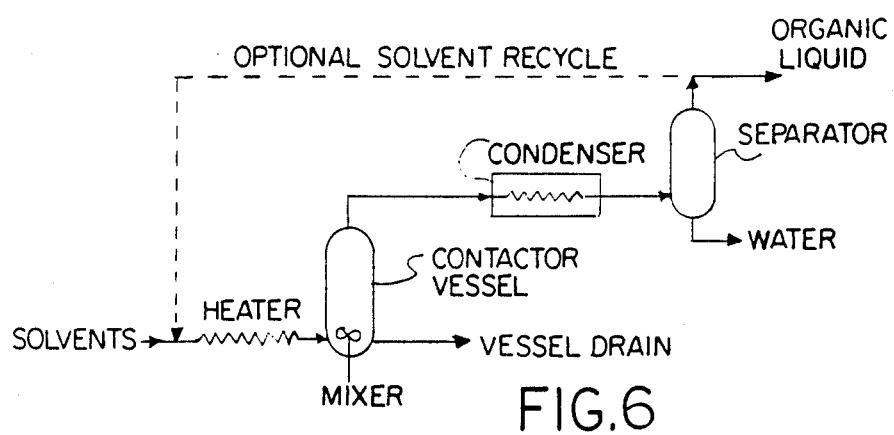
FIG. 6 is a flow sheet illustrating the process of FIG. 1 wherein the feed composition and the first organic solvent are maintained at a sufficiently high temperature to vaporize water in said feed composition and separate the vaporized water from the solids.

FIG. 6 is a flow sheet illustrating an embodiment of the inventive process wherein a contactor vessel, condenser, separator, and a heater for heating solvents entering the contactor vessel are used. The contactor vessel is equipped with an agitator. Alternatively, other conventional agitation means (e.g., recirculating pump, etc.) can be used. Agitation during both steps (A) and (B) of the inventive process is optional, but preferred, and when used can be continuous or intermittent. The feed composition to be treated is preferably pretreated as discussed above and resulting partially de-oiled and de-watered solids are placed in the contactor vessel. Alternatively, with this embodiment, de-watering is not necessary since de-watering occurs during the vaporization step of this process. The first organic solvent is heated to a temperature in excess of the boiling point of water, and then advanced upwardly through contactor vessel in contact with the feed composition. The upward flow of the first organic solvent through the solids dissolves the extractable organic materials that are intermixed with the solids and displaces the resulting first solution upwardly through the contactor vessel to and through an outlet in the top of the contactor vessel. The elevated temperature of the first organic solvent vaporizes the water that is intermixed with the solids, the vaporized water also advancing upwardly through the contactor to and through an outlet in the top of the contactor vessel. The first solution of solvent and extracted organics, and the vaporized water are advanced through the condenser wherein they are condensed and then to the separator. In the separator, the water and organics (i.e., solvent plus extracted organic materials) are separated from each other. Step (A) is continued until the extractable organic materials are completely extracted or reduced to acceptable levels. The solution of solvent and extracted organic material can be recycled to the contactor vessel until the concentration level of extracted organic materials in the solvent reaches a level wherein further extraction becomes relatively inefficient. At the end of step (A) of the inventive process, the resulting intermediate composition remaining in the contactor vessel comprises the solids with some of the first organic solvent remaining intermixed therewith. All or substantially all of the water that was intermixed with the pretreated solids at the beginning of step (A) is vaporized and separated from the solids. Step (B) of the inventive process is commenced by introducing the volatile organic solvent into the contactor vessel. The volatile organic solvent is advanced upwardly through the solids, dissolves the remaining first organic solvent, and displaces the resulting second solution upwardly to and through the contactor vessel outlet. The first organic solvent and the volatile organic solvent are advanced through the condenser wherein they are cooled to the separator wherein they are separated from each other. The first organic solvent can be stored for further use in accordance with the inventive process. The volatile organic solvent can be recycled to the contactor vessel. Step (B) is continued until all or substantially all of the first organic solvent is extracted from the solids. Upon completion of step (B) of the process, the volatile organic solvent remaining intermixed with the solids is separated from the solids by any of a number of conventional techniques including displacing the volatile organic solvent with water or an inert gas, drying the solids, etc. The solids are removed from the contactor vessel and disposed of using conventional solids disposal techniques.

FIG. 7 is a flow sheet illustrating a refinery system for separating extractable organic materials and water from a refinery sludge. These sludges typically contain undesirable metals and/or metal compounds intermixed therewith. The solvent extraction unit is a two-step extraction unit in accordance with the present invention. The refinery sludge is pumped to temporary storage tanks wherein filtration aids are added and the mixture is homogenized. Filtration aids (e.g., clay, lime, diatomaceous earth, etc.) are preferably added at a level of about 0.5 to about 1 part by weight of filtration aid per part by weight of dry solids. The conditioned sludge is then subjected to mechanical deliquification (e.g., a recessed plate filter press, vacuum filter, etc.) to partially de-oil and de-water the sludge. This step of the process can be conducted at moderate temperatures (e.g., up to about 150° F.) and moderate filter press pressures (e.g., up to about 100 psig). The solids are filtered out and accumulated in the filter press chambers, while the oil and water are separated from the filtrate. The recovered oil can be returned to the crude unit for processing while the filtrate water can be returned to the forebay of the API separator for further treatment. The solvent extraction unit is designed and operated in the same manner in which the extraction unit depicted in FIG. 1 is designed and operated. Alternatively, this refinery system could be adapted to use any of the extraction processes illustrated in FIGS. 2-6. The first organic solvent and the volatile organic solvent are supplied by process units in the refinery system. The effluents from the extraction unit (that is, the first solution of extractable organic materials dissolved in the first organic solvent, and the second solution of first organic solvent dissolved in volatile organic solvent) are returned to the refinery system for further use and/or processing. Preferably, the extraction process is conducted until the level of extractable organic materials intermixed with the solids is reduced to a level of less than about 1% by weight based on the weight of the solids. The solids are advanced from the extraction unit to the fixation unit wherein they are slurried in water with one or more fixation chemicals (e.g., silica- or silicate-bearing solutions, fly ash, sodium sulfide, etc.) to fix the metals and/or metal compounds intermixed with the solids to such solids to prevent or reduce to acceptable levels subsequent leaching of the metals and metal compounds from the solids.

The following examples are illustrative of the process of the present invention. Unless otherwise indicated, in the following examples as well as throughout the entire specification and in the appended claims, all parts and percentages are by weight, and all temperatures are in degrees Fahrenheit.

EXAMPLE 1

5510 pounds of a refinery sludge are charged to a 2650 gallon contactor vessel. The contactor vessel has a solvents inlet in its bottom and an effluent outlet in its top. The refinery sludge has a solids content of 49.2% by weight, an extractable organic material (hydrocarbon oil and heavy residual organics including asphaltenes) content of 21.3% by weight, and a water content of 29.5% by weight. No free water is present in the sludge. The first organic solvent is a heavy reformate having an initial boiling point of 274° F., a 90% by weight boiling point of 398° F. (that is, 90% by weight of the reformate boils at a temperature of 398° F. or less), a final boiling point of 474° F., an aromatic compound content of 92% by weight. The volatile organic solvent is propane. The average operating pressure in the contactor vessel is 245 psig, with a maximum pressure of 275 psig and a minimum pressure of 5 psig. 2835 gallons of the heavy reformate at a temperature of 88°-91° F. are advanced upwardly through the contactor vessel in contact with the sludge at a flow rate of 45 gallons per minute. 4990 gallons of the heavy reformate at a temperature of 240° F. are then advanced upwardly through the contactor vessel in contact with the sludge at a flow rate of 42 gallons per minute. 4687 gallons of the heavy reformate at a temperature of 218° F. are then advanced upwardly through the contactor vessel in contact with the sludge at a flow rate of 43 gallons per minute. 5263 gallons of the heavy reformate at a temperature of 86° F. are then advanced upwardly through the contactor vessel in contact with the sludge at a flow rate of 43 gallons per minute. 9963 gallons of propane at a temperature of 110° F. are then advanced upwardly through the contactor vessel in contact with the sludge at a flow rate of 75 gallons per minute. 2550 gallons of water at a temperature of 110° F. are then advanced upwardly through the contactor vessel in contact with the sludge at a flow rate of 75 gallons per minute. The contactor vessel contents are removed and found to have a solids content of 11.6% by weight, an organic liquid content of 0.3% by weight and a water content of 88.1% by weight. Part of this product is filtered through a filter press, the filtered product having a solids content of 44.4% by weight, an organic liquid content of 1.0% by weight and a water content of 54.7% by weight. Another part of the contactor vessel contents are initially mixed with the following fixation chemicals: Pozzalime at a level of 30% by weight based on the weight of the solids in said contactor vessel contents; and sodium sulfide at a level of 50 ppm based on the total weight of said contactor vessel contents. The fixated product mixture is filtered through a filter press to provide a fixated filtered product having a solids content of 48.8% by weight, an organic liquid content of 0.5% by weight and a water content of 50.7% by weight. The fixated-filtered product is analyzed for the following materials:

| Compound | Product |
| --- | --- |
| Volatiles (mg/kg) | |
| Benzene | ND* |
| Toluene | ND* |
| Xylenes | 149 |
| Basic/Neutral Semi-Volatiles (mg/kg) | |
| Anthracene | NA** |
| Benzo(a)anthracene | NA** |
| Benzo(a)pyrene | 0.88 |
| Bis(2-ethylhexyl)phthalate | ND*** |
| Chrysene | ND*** |
| Di-n-butyl phthalate | ND*** |
| Ethylbenzene | NA** |
| Naphthalene | 160 |
| Phenanthrene | 4.0 |
| Pyrene | 2.0 |
| Acidic Semi-Volatiles (mg/kg) | |
| Phenol | ND*** |
| o-Cresol | ND*** |
| p-Cresol | ND*** |
| Metals (mg/l in leachate) | |
| Arsenic | 0.014 |
| Chromium, total | 0.60 |

-continued

| Compound | Product |
| --- | --- |
| Nickel | 0.30 |
| Selenium | ND**** |
| Vanadium | ND***** |
| Other (mg/kg) | |
| Cyanide, total | 19 |

ND* = Not detected.
NA** = Not analyzed.
ND*** = Not detected, detection limit was 2.0 mg/kg.
ND**** = Not detected, detection limit was 0.04 mg/l.
ND***** = Not detected, detection limit was 0.05 mg/l.

EXAMPLE 2

The feed composition is an ecology pit sludge having a solids content of 33% by weight, a water content of 37% by weight and an an extractable organic material (hydocarbon oil and heavy residual organics including asphaltenes) content of 30% by weight. This sludge is self-adhering, dark in color, and has a noxious odor. One part by weight of the sludge is mixed with one part by weight of diesel fuel in an open beaker. The temperature of the mixture is raised from room temperature to 230° F. over a ten-minute period with stirring. Substantially all of the water in the sludge is removed as steam. Diesel fuel is drained from the solids. The solids are placed in a contactor vessel. The vessel is sealed and purged. Two parts by weight of pentane are advanced through the contactor vessel in contact with the solids. The temperature is 75° F. and the pressure is atmospheric. The effluent is a mixture of pentane and diesel fuel.

EXAMPLE 3

The feed composition is a filter cake sludge having a solids content of 39% by weight, a water content of 42% by weight and an an extractable organic material (hydocarbon oil and heavy residual organic including asphaltenes) content of 19% by weight. This sludge is self-adhering, dark in color, and has a noxious odor. One part by weight of the sludge is mixed with one part by weight of diesel fuel in an open beaker. The temperature of the mixture is raised from room temperature to 230° F. over a ten-minute period with stirring. Substantially all of the water in the sludge is removed as steam. Diesel fuel is drained from the solids. Additional diesel fuel is removed using vacuum filtration. The solids are placed in a contactor vessel. The vessel is sealed and purged. Two parts by weight of propane are advanced through the contactor vessel in contact with the solids. The temperature is 75° F. and the pressure is 150 psig. The effluent of propane intermixed with diesel fuel is depressurized through a heated valve. The propane flashes and the diesel fuel deposits in a flash pot.

EXAMPLE 4

The feed composition is a production sludge having a solids content of 22% by weight, a water content of 32% by weight and an extractable organic material (hydrocarbon oil and heavy residual organics including asphaltenes) content of 46% by weight. The organic liquid in this sludge has an initial boiling point of 378° F., a 10% by weight off boiling point of 562° F. (that is, 10% by weight of the organic liquid boils off at a temperature of 562° F. or less), a 25% by weight off boiling point of 724° F., and a 50% by weight off boiling point of 1000° F. The first organic solvent is a reformate with an initial boiling point of 230° F. and a final boiling point of 375° F. This reformate contains toluene, ethylbenzene, o-xylene and p-xylene. 1213 parts by weight of the sludge are mixed with 532 parts by weight of the reformate in a contactor vessel and heated at a temperature of 212° F. with stirring. The pressure is atmospheric pressure. The mixture boils and steam is allowed to escape. The viscosity of the mixture increases, and 588 parts by weight of the reformate are added. All or substantially all of the water is removed and the temperature of the mixture increases to 257° F. The hot mixture is pressure filtered using 5-10 psig nitrogen. The filter cake depth is in excess of 2 inches. The filter cake is slurried with 890 parts by weight of reformate, heated to 212° F., then pressure filtered. The resulting filter cake is reslurried with 670 parts of reformate, heated to 212° F., then pressure filtered. The resulting filter cake is again reslurried with 670 parts of reformate, heated to 212° F., then pressure filtered. The resulting filter cake is reslurried with 675 parts of reformate at room temperature, then pressure filtered. The resulting filter cake is again reslurried with 300 parts of reformate at room temperature, then pressure filtered. The resulting filter cake is washed with 500 parts of pentane at room temperature, then pressure filtered. The resulting filter cake is again washed with 500 parts of pentane at room temperature, then pressure filtered. Residual pentane remaining intermixed with the solids is removed by air drying. Soxhlet extraction of the product solids indicates a composition comprising 99.9% by weight solids, 0.1% by weight organic liquid, and no water. Dean and Stark distillation of the product solids indicates a water content of 0% by weight.

EXAMPLE 5

The feed composition is a production sludge having a solids content of 22% by weight, a water content of 32% by weight and an extractable organic material (hydrocarbon oil and heavy residual organics including asphaltenes) content of 46% by weight. The organic liquid in this sludge has an initial boiling point of 378° F., a 10% by weight off boiling point of 562° F. (that is, 10% by weight of the organic liquid boils off at a temperature of 562° F. or less), a 25% by weight off boiling point of 724° F., and a 50% by weight off boiling point of 1000° F. The first organic solvent is a reformate with an initial boiling point of 230° F. and a final boiling point of 375°. This reformate contains toluene, ethylbenzene, o-xylene and p-xylene. 3373 parts by weight of the sludge are mixed with 1015 parts by weight of the reformate in a contactor vessel and heated at a temperature of 230° F. with stirring. The pressure is atmospheric pressure. The mixture boils and steam is allowed to escape. The hot mixture is pressure filtered. The filter cake is slurried with 500 parts by weight of reformate, heated to 212° F., then pressure filtered. .The resulting filter cake is reslurried with 500 parts of reformate, heated to 212° F., then pressure filtered. The solids are washed four times with hot reformate using 500 part aliquots of reformate with each wash. The solids are then washed twice with pentane using 500 part aliquots of pentane with each wash. Pressure filtration is used at the end of each wash to separate the solids from the filtrate. Soxhlet extraction of the product solids indicates a composition comprising 99.5% by weight solids, 0.4% by weight organic liquid, and no water.

EXAMPLE 6

The feed composition is a production sludge having a solids content of 22% by weight, a water content of 32% by weight and an extractable organic material (hydrocarbon oil and heavy residual organics including asphaltenes) content of 46% by weight. The organic liquid in this sludge has an initial boiling point of 378° F., a 10% by weight off boiling point of 562° F. (that is, 10% by weight of the organic liquid boils off at a temperature of 562° F. or less), a 25% by weight off boiling point of 724° F., and a 50% by weight off boiling point of 1000° F. The first organic solvent is a reformate with an initial boiling point of 230° F. and a final boiling point of 375° F. This reformate contains toluene, ethylbenzene, o-xylene and p-xylene. 25,500 parts by weight of the sludge are mixed with 7500 parts by weight of the reformate in a contactor vessel and heated at a temperature of 248° F. with stirring. The pressure is atmospheric pressure. The mixture boils and steam is allowed to escape. All or substantially all of the water is removed The hot mixture is filtered. The solids are washed with three aliquots of hot reformate, each aliquot having 3000 parts. The solids are then washed with two aliquots of hexane, each aliquot having 3000 parts. Filtration is used after each washing to separate the solids from the filtrate. After the second wash with hexane, the residual hexane remaining intermixed with the solids is removed by drying in a convection oven. Soxhelet extraction of the product solids indicates a composition comprising 99.6% by weight solids, 0.4% by weight organic liquid, and no water.

EXAMPLE 7

The feed composition is a production sludge having a solids content of 22% by weight, a water content of 32% by weight and an extractable organic material (hydrocarbon oil and heavy residual organics including asphaltenes) content of 46% by weight. The organic liquid in this sludge has an initial boiling point of 378° F., a 10% by weight off boiling point of 562° F. (that is, 10% by weight of the organic liquid boils off at a temperature of 562° F. or less), a 25% by weight off boiling point of 724° F., and a 50% by weight off boiling point of 1000° F. The first organic solvent is a sand frac oil which is a cut from fluid catalytic cracker. This solvent has an initial boiling point of 500° F., and an 80% by weight off boiling point of 626° F. 1192 parts by weight of the sludge are mixed with 504 parts by weight of the solvent in a contactor vessel and heated at a temperature of 212° F. with stirring. The pressure is atmospheric pressure. The mixture boils and steam is allowed to escape. The viscosity of the mixture increases, and 350 parts by weight of the sand frac oil is added. The temperature of the mixture increases to 257° F. The hot mixture is pressure filtered using 5-10 psig nitrogen The filter cake depth is in excess of 2 inches. The solids are slurried with 500 parts by weight of sand frac oil, heated to 212° F., then pressure filtered. The solids are washed four times using 500 part aliquots of hot sand frac oil. The solids are then washed twice with pentane, each time with 500 parts aliquots of pentane. Pressure filtration is used at the end of each washing to separate the solids from the filtrate. Soxhelet extraction of the product solids indicates a composition comprising 99.5% by weight solids, 0.5% by weight organic liquid, and no water.

EXAMPLE 8

The feed composition is a production sludge having a solids content of 22% by weight, a water content of 32% by weight and an extractable organic material (hydrocarbon oil and heavy residual organics including asphaltenes) content of 46% by weight. The organic liquid in this sludge has an initial boiling point of 378° F., a 10% by weight off boiling point of 562° F. (that is, 10% by weight of the organic liquid boils off at a temperature of 562° F. or less), a 25% by weight off boiling point of 724° F., and a 50% by weight off boiling point of 1000° F. The first organic solvent is a reformate with an initial boiling point of 420° F., a 50% by weight off boiling point of 520° F., and a final boiling point of 620° F. This reformate has an aromatic content of 95% by volume. 1258 parts by weight of the sludge are mixed with 450 parts by weight of the reformate in a contactor vessel and heated at a temperature of 230° F. with stirring. The pressure is atmospheric pressure. The mixture boils and steam is allowed to escape. The mixture is pressure filtered. The filter cake is slurried with 500 parts by weight of reformate, heated to 212° F., then pressure filtered. The resulting filter cake is reslurried with 250 parts of reformate, heated to 212° F., then pressure filtered. The solids are washed with three aliquots of hot reformate, each aliquot being 250 parts. The solids are then washed with two aliquots of pentane, each aliquot being 400 parts. Pressure filtration is used at the end of each washing to separate the solids from the filtrate. Soxhelet extraction of the product solids indicates a composition comprising 99.4% by weight solids, 0.6% by weight organic liquid, and no water.

EXAMPLE 9

The feed composition is a an ecology pit sludge having a solids content of 0.5% by weight, a water content of 90.7% by weight and an extractable organic material (hydrocarbon oil and heavy residual organics including asphaltenes) content of 8.8% by weight. The first organic solvent is a reformate with an initial boiling point of 230° F. and a final boiling point of 375° F. This reformate contains toluene, ethylbenzene, o-xylene and p-xylene. 22,600 parts by weight of the sludge are mixed with 10,400 parts by weight of the reformate in a contactor vessel and heated at a temperature of 248° F. with stirring. The pressure is atmospheric pressure. The mixture boils and steam is allowed to escape. All or substantially all of the water is removed. The hot mixture is pressure filtered. The solids are washed with two aliquots of hot reformate, each aliquot having 200 parts. The solids are then washed with two aliquots of hexane, each aliquot having 200 parts. Pressure filtration is used after each washing to separate the solids from the filtrate After the second wash with hexane, the residual hexane remaining intermixed with the solids is removed by drying in a convection oven. Soxhelet extraction of the product solids indicates a composition comprising 99.8% by weight solids, 0.2% by weight organic liquid, and no water.

EXAMPLE 10

The feed composition is a filter press cake of a refinery sludge having a solids content of 43.4% by weight, a water content of 34.9% by weight and an extractable organic material (hydrocarbon oil and heavy residual organics including asphaltenes) content of 21.7% by weight. The first organic solvent is kerosene. 163.2 grams of the sludge are placed in a contactor vessel. The sludge is in the form of a fixed bed. The temperature is 250° F. and the pressure is 300 psig. 1200 cc of kerosene flow upwardly through the bed over a period of 2.5 hours. The contactor vessel contents are cooled to 110° F. 1400 cc of n-pentane flow upwardly through the bed over a period of 2.5 hours at a pressure of 300 psig. Free liquid n-pentane in the contactor is drained from the contactor. The n-pentane remaining intermixed with the solids is evaporated from the solids at room temperature and atmospheric pressure. Soxhelet extraction of the product solids indicates a composition comprising less than 1.5% by weight organic liquid Most of the water remains intermixed with the solids.

EXAMPLE 11

The feed composition is a filter press cake of a refinery sludge having a solids content of 43.4% by weight, a water content of 34.9% by weight and an extractable organic material (hydrocarbon oil and heavy residual organics including asphaltenes) content of 21.7% by weight The first organic solvent is cyclohexane. 153.5 grams of the sludge are placed in a contactor vessel. The sludge is in the form of a fixed bed. The temperature is 126° F. and the pressure is 300 psig. 1200 cc of cyclohexane flow upwardly through the bed over a period of 2.5 hours. 1200 cc of n-pentane flow upwardly through the bed over a period of 2.5 hours at a pressure of 300 psig. Free liquid n-pentane in the contactor is drained from the contactor. The n-pentane remaining intermixed with the solids is evaporated from the solids at room temperature and atmospheric pressure Soxhelet extraction of the product solids indicates a composition comprising less than 2% by weight organic liquid. Most of the water remains intermixed with the solids.

EXAMPLE 12

The feed composition is a production sludge which has been partially de-watered and de-oiled in a filter press using diatomaceous earth as a filter aid. The feed composition has a solids content of 49.8% by weight, a water content of 14.3% by weight, and an organic liquid content of 35.9% by weight. The first organic solvent is kerosene. The volatile organic solvent is n-pentane. Contacting the feed with the solvent is effected using a mixer-settler mode. That is, solvent is mixed with the contactor vessel contents for 0.5 minute, the mixture is allowed to settle for 3 minutes, then the liquid is decanted off the top of the mixture. The sequence is repeated nine times using kerosene, then seven times using n-pentane. During contacting with the kerosene the temperature is 176° F. and the pressure is atmospheric. 181.1 grams of the feed composition are placed in the contactor vessel. The amount of kerosene added to the contactor vessel contents, the weight of the contactor vessel contents during the mix and settle step, and the weight of the contactor vessel contents after liquid is decanted off the top of the mixture are as follows (all numerical values except Run Nos. being in grams):

| Run No. | Kerosene Added | Contactor Vessel Contents | |
|---|---|---|---|
| | | Mix & Settle | After Decant |
| 1 | 197.3 | 378.4 | 242.6 |
| 2 | 143.8 | 386.4 | 234.3 |
| 3 | 146.4 | 380.7 | 239.6 |
| 4 | 142.1 | 381.7 | 226.1 |

-continued

| Run No. | Kerosene Added | Contactor Vessel Contents | |
|---|---|---|---|
| | | Mix & Settle | After Decant |
| 5 | 161.8 | 387.9 | 237.6 |
| 6 | 136.8 | 374.4 | 229.8 |
| 7 | 144.9 | 374.1 | 221.9 |
| 8 | 150.5 | 372.4 | 225.3 |
| 9 | 147.2 | 372.5 | 264.5 |

A total of 1370.8 grams of kerosene is used. The above mix-settle-decant procedure is then repeated seven times using 119 grams of n-pentane with each run, the temperature being 70° F. and the pressure being atmospheric. After the seventh run, liquid n-pentane is drained off, and n-pentane remaining intermixed with the solids is evaporated off at room temperature and atmospheric pressure.

An advantage of this invention is that an efficient, economical and reliable process is provided for treating solid and hazardous wastes such as refinery sludges, production sludges, etc., to render the product solids from this process delistable and/or to facilitate additional handling and treatment of the solids, e.g., treatment by fixation to prevent metal leaching. An additional advantage is that this process is adaptable to treating other compositions wherein extractable organic materials are intermixed with solids and water.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

We claim:

1. A process for separating extractable organic material from a feed composition comprising said extractable organic material intermixed with solids and water, the process comprising the steps of:

(A) contacting said feed composition with a first organic solvent, said first organic solvent being capable of dissolving at least about ten parts of said extractable organic material per million parts of said first organic solvent at the temperature wherein at least about 50% by weight of said first organic solvent boils at atmospheric pressure; dissolving at least part of said extractable organic material in said first organic solvent to form a first solution; and separating at least part of said first solution from said feed composition to provide an intermediate composition, part of said first organic solvent remaining intermixed with said intermediate composition; and (B) contacting said intermediate composition with a volatile organic solvent, said volatile organic solvent being different than and more volatile than said first organic solvent and being capable of dissolving at least about ten parts of said first organic solvent per million parts of said volatile organic solvent at the temperature wherein at least about 50% by weight of said volatile organic solvent boils at atmospheric pressure; dissolving at least part of said first organic solvent in said volatile organic solvent to form a second solution; and separating said second solution from said intermediate composition to provide a treated product.

2. The process of claim 1 wherein said treated product comprises solids intermixed with water, said process including the step of separating at least part of said water from said treated product.

3. The process of claim 1 wherein said treated product comprises at least one metal or metal compound intermixed with said solids, said process including the step of mixing an effective amount of at least one fixation chemical with said treated product to fix said metal or metal compound to said solids.

4. The process of claim 1 wherein said process includes separating at least part of said water from said feed composition prior to step (A).

5. The process of claim 1 wherein the boiling point of at least about 50% by weight of said first organic solvent is in excess of the boiling point of water, said process including vaporizing at least part of said water during step (A).

6. The process of claim 1 wherein said feed composition comprises free water and the boiling point of at least about 50% by weight of said first organic solvent is in excess of the boiling point of water, said process including vaporizing all or substantially all of said free water during step (A).

7. The process of claim 1 wherein said process includes recycling at least part of said first solution separated during step (A) into contact with said feed composition.

8. The process of claim 1 wherein said process includes recycling at least part of said second solution separated during step (B) into contact with said intermediate composition.

9. The process of claim 1 wherein at least part of said extractable organic material is present in said intermediate composition from step (A), said process further comprising:
   contacting said intermediate composition with a supplementary organic solvent prior to step (B), said supplementary organic solvent being capable of dissolving at least about ten parts of said extractable organic material per million parts of said supplementary organic solvent at the temperature wherein at least about 50% by weight of said supplementary organic solvent boils at atmospheric pressure; dissolving at least part of said extractable organic material in said supplementary organic solvent to form a supplementary first solution; and separating said supplementary first solution from said intermediate composition.

10. The process of claim 9 wherein said supplementary organic solvent is the same as said first organic solvent.

11. The process of claim 1 wherein at least part of said first organic solvent is present in said treated product from step (B), said process further comprising:
   contacting said treated product with a supplementary volatile organic solvent, said supplementary volatile organic solvent being capable of dissolving at least about ten parts of said first organic solvent per million parts of said supplementary volatile organic solvent at the temperature wherein at least about 50% by weight of said supplementary volatile organic solvent boils at atmospheric pressure; dissolving at least part of said first organic solvent in said supplementary volatile organic solvent to form a supplementary second solution; and separating said supplementary second solution from said treated product.

12. The process of claim 11 wherein said volatile organic solvent is the same as said supplementary volatile organic solvent.

13. The process of claim 1 wherein at least part of said extractable organic material is present in said treated product from step (B), said process further comprising:
   contacting said treated product with a supplementary organic solvent, said supplementary organic solvent being capable of dissolving at least about ten parts of said extractable organic material per million parts of said supplementary organic solvent at the temperature wherein at least about 50% by weight of said supplementary organic solvent boils at atmospheric pressure; dissolving at least part of said extractable organic material in said supplementary organic solvent to form a supplementary first solution; separating said supplementary first solution from said treated product to form a supplementary intermediate composition, part of said supplementary organic solvent remaining intermixed with said supplementary intermediate composition; and
   contacting said supplementary intermediate composition with a supplementary volatile organic solvent, said supplementary volatile organic solvent being capable of dissolving at least about ten parts of said supplementary organic solvent per million parts of said supplementary volatile organic solvent at the temperature wherein at least about 50% by weight of said supplementary volatile organic solvent boils at atmospheric pressure; dissolving at least part of said supplementary organic solvent in said supplementary volatile organic solvent to form a supplementary second solution; separating said supplementary second solution from said supplementary intermediate composition to provide a supplementary treated product.

14. The process of claim 13 wherein said supplementary organic solvent is the same as said first organic solvent.

15. The process of claim 13 wherein said supplementary volatile organic solvent is the same as said volatile organic solvent.

16. The process of claim 1 wherein said process includes the step of recycling at least part of said intermediate composition from step (A) into contact with said feed composition.

17. The process of claim 1 wherein said process includes the step of recycling at least part of said treated product from step (B) into contact with said feed composition.

18. The process of claim 1 wherein said process includes the step of recycling at least part of said treated product from step (B) into contact with said intermediate composition.

19. The process of claim 1 wherein said feed composition comprises solid waste.

20. The process of claim 1 wherein said feed composition comprises hazardous waste.

21. The process of claim 1 wherein said feed composition comprises petroleum waste.

22. The process of claim 1 wherein said feed composition comprises refinery sludge.

23. The process of claim 1 wherein said solids are porous solids.

24. The process of claim 1 wherein said solids comprise liquid-filled, porous solids.

25. The process of claim 1 wherein said feed composition comprises:
   (i) up to about 98% by weight water;
   (ii) up to about 90% by weight inorganic solids;
   (iii) up to about 98% by weight organic solids;
   (iv) up to about 98% by weight organic liquid;
   (v) up to about 90% by weight metals, metal compounds or mixtures thereof; and
   (vi) up to about 98% by weight four-ring polynuclear aromatic compounds, five-ring polynuclear aromatic compounds or mixtures thereof.

26. The process of claim 1 wherein said first organic solvent comprises at least one aromatic compound, cycloaliphatic compound, aliphatic-substituted aromatic compound, cycloaliphatic-substituted aromatic compound, aliphatic-substituted cycloaliphatic compound, or mixture of two or more thereof.

27. The process of claim 1 wherein said first organic solvent comprises an aromatic-rich solvent.

28. The process of claim 1 wherein said first organic solvent comprises benzene, toluene, xylene, naphthalene, kerosene, fuel oil, or a mixture of two or more thereof 29. The process of claim 1 wherein at least about 50% by weight of said first organic solvent boils at a temperature below about 750° F. at atmospheric pressure.

30. The process of claim 1 wherein said first organic solvent has an initial boiling point in the range of about 0° F. to about 500° F. at atmospheric pressure, and a final boiling point in the range of about 200° F. to about 1000° F. at atmospheric pressure.

31. The process of claim 1 wherein said first organic solvent has an initial boiling point in the range of about 50° F. to about 150° F. at atmospheric pressure, and a final boiling point in the range of about 200° F. to about 300° F. at atmospheric pressure.

32. The process of claim 1 wherein said first organic solvent has an initial boiling point in the range of about 300° F. to about 500° F., and a final boiling point in the range of about 650° F. to about 850° F.

33. The process of claim 1 wherein said first organic solvent has an initial boiling point in the range of about 180° F. to about 280° F., and a final boiling point in the range of about 325° F. to about 425° F.

34. The process of claim 1 wherein said first organic solvent has an initial boiling point in the range of about 200° F. to about 325° F., and a final boiling point in the range of about 425° F. to about 525° F.

35. The process of claim 1 wherein said volatile organic solvent is an aliphatic, aromatic or cycloaliphatic hydrocarbon of from 2 to about 9 carbon atoms, or is a halohydrocarbon of from 1 to about 9 carbon atoms, or is a mixture of two or more thereof.

36. The process of claim 1 wherein said volatile organic solvent has from 3 to about 5 carbon atoms.

37. The process of claim 1 wherein said volatile organic solvent is selected from the group consisting of propane, cyclopropane, propylene, n-butane, isobutane, cyclobutane, butene, butadiene, isobutylene, n-pentane, isopentane, neopentane, cyclopentane, pentene, cyclopentene, pentadiene, cyclopentadiene, cyclohexane, cyclohexene, cyclohexadiene, methylene chloride, dichlorodifluoromethane, trichlorofluoromethane, chloroethane, trichloroethane, dichlorotetrafluoroethane, trichloroethylene, tetrafluoroethylene, chloropropane, chlorobutane, chloropentane, dichloropentane, and mixtures of two or more thereof.

38. The process of claim 1 wherein said volatile organic solvent comprises propane.

39. The process of claim 1 wherein said volatile organic solvent comprises pentane.

40. The process of claim 1 wherein said volatile organic solvent comprises benzene, toluene, xylene or mixtures of two or more thereof.

41. The process of claim 1 wherein said volatile organic solvent comprises hydrocarbons of from about 5 to about 7 carbon atoms.

42. The process of claim 1 wherein said volatile organic solvent comprises gas well condensate comprising hydrocarbons of from about 5 to about 7 carbon atoms.

43. The process of claim 1 wherein at least about 30% by weight of said first organic solvent is in a condensed state during step (A).

44. The process of claim 1 wherein said first organic solvent is at a temperature in the range of about 0° F. to about 800° F. during step (A).

45. The process of claim 1 wherein the average contact time between said first organic solvent and said feed composition during step (A) is from about 0.01 minutes to about 100 hours.

46. The process of claim 1 wherein mechanical means are provided to mix said feed composition with said first organic solvent during step (A), and mechanical means are provided to separate said first solution from said feed composition during step (A).

47. The process of claim 1 wherein mechanical means are provided to mix said intermediate composition and said volatile organic solvent during step (B), and mechanical means are provided to separate said second solution from said intermediate composition during step 48. The process of claim 1 wherein at least about 30% by weight of said volatile organic solvent is in a condensed state during step (B).

49. The process of claim 1 wherein said volatile organic solvent is at a temperature in the range of about 0° F. to about 500° F. during step (B).

50. The process of claim 1 wherein the average contact time between said volatile organic solvent and said intermediate composition is from about 0.01 minutes to about 100 hours during step (B).

51. The process of claim 1 wherein said process is operated on a batch basis.

52. The process of claim 1 wherein said process is operated on a continuous basis.

53. The process of claim 1 wherein step (A) is operated on a continuous basis and step (B) is operated on a batch basis.

54. The process of claim 1 wherein step (A) is operated on a batch basis and step (B) is operated on a continuous basis.

55. The process of claim 1 wherein during step (A) said contacting is effected in an enclosed space, said first organic solvent entering said enclosed space on a batch basis.

56. The process of claim 1 wherein during step (A) said contacting is effected in an enclosed space, said first organic solvent entering said enclosed space on a continuous basis.

57. The process of claim 1 wherein during step (B) said contacting is effected in an enclosed space, said volatile organic solvent entering said enclosed space on a batch basis.

58. The process of claim 1 wherein during step (B) said contacting is effected in an enclosed space, said volatile organic solvent entering said enclosed space on a continuous basis.

59. The process of claim 1 wherein during step (A) said contacting is effected in an enclosed space, said feed composition entering said enclosed space on a batch basis.

60. The process of claim 1 wherein during step (A) said contacting is effected in an enclosed space, said feed composition entering said enclosed space on a continuous basis 61. The process of claim 1 wherein during step (B) said contacting is effected in an enclosed space, said intermediate composition entering said enclosed space on a batch basis.

62. The process of claim 1 wherein during step (B) said contacting is effected in an enclosed space, said intermediate composition entering said enclosed space on a continuous basis.

63. The process of claim 1 wherein said feed composition comprises production sludge.

64. The process of claim 1 wherein said volatile organic solvent comprises liquified petroleum gas, gas well condensate or a mixture thereof.

65. A process for separating extractable organic material from a feed composition comprising said extractable organic material intermixed with solids and water, the process comprising the steps of:
contacting said feed composition with a first organic solvent, at least about 50% by weight of said first organic solvent having a boiling point in excess of the boiling point of water, said first organic solvent being capable of dissolving at least about ten parts of said extractable organic material per million parts of said first organic solvent at the temperature wherein at least about 50% by weight of said first organic solvent boils at atmospheric pressure; maintaining said feed composition and said first organic solvent at a sufficient temperature for an effective period of time to vaporize at least part of said water; dissolving at least part of said extractable organic material in said first organic solvent to form a first solution; and separating at least part of said first solution and said vaporized water from said feed composition to provide an intermediate composition, part of said first organic solvent remaining intermixed with said intermediate composition; and
(B) contacting said intermediate composition with a volatile organic solvent, said volatile organic solvent being different than and more volatile than said first organic solvent and being capable of dissolving at least about ten parts of said first organic solvent per million parts of said volatile organic solvent at the temperature wherein at least about 50% by weight of said volatile organic solvent boils at atmospheric pressure; dissolving at least part of said first organic solvent in said volatile organic solvent to form a second solution; and separating said second solution from said intermediate composition to provide a treated product.

66. A process for separating extractable organic material from a feed composition comprising said extractable organic material intermixed with solids and water, the process comprising the steps of:
(A) contacting said feed composition with at least one first organic solvent selected from the group consisting of kerosene and fuel oil; dissolving at least part of said extractable organic material in said first organic solvent to form a first solution; and separating at least part of said first solution from said feed composition to provide an intermediate composition, part of said first organic solvent remaining intermixed with said intermediate composition; and
(B) contacting said intermediate composition with a volatile organic solvent selected from the group consisting of hydrocarbons having from about 3 to about 5 carbon atoms; dissolving at least part of said first organic solvent in said volatile organic solvent to form a second solution; and separating said second solution from said intermediate composition to provide a treated product.

67. A process for separating extractable organic material from a feed composition comprising said extractable organic material intermixed with solids and water, the process comprising the steps of:
(A) contacting said feed composition with a first organic solvent, said first organic solvent having an aromatic content in excess of about 25% by weight, an initial boiling point in the range of about 0° F. to about 500° F. and a final boiling point in the range of about 200° F. to about 1000° F.; dissolving at least part of said extractable organic material in said first organic solvent to form a first solution; and separating at least part of said first solution from said feed composition to provide an intermediate composition, part of said first organic solvent remaining intermixed with said intermediate composition; and
(B) contacting said intermediate composition with at least one volatile organic solvent that is more volatile than said first organic solvent and is selected from the group consisting of hydrocarbons having from about 3 to about 5 carbon atoms; dissolving at least part of said first organic solvent in said volatile organic solvent to form a second solution; and separating said second solution from said intermediate composition to provide a treated product.

68. A process for separating extractable organic material from a feed composition comprising said extractable organic material intermixed with solids and water, the process comprising the steps of:
(A) contacting said feed composition with a first organic solvent, said first organic solvent having an aromatic compound content in excess of about 50% by weight, an initial boiling point in the range of about 200° F. to about 325° F. and a final boiling point in the range of about 425° F. to about 525° F.; dissolving at least part of said extractable organic material in said first organic solvent to form a first solution; and separating at least part of said first solution from said feed composition to provide an intermediate composition, part of said first organic solvent remaining intermixed with said intermediate composition; and
(B) contacting said intermediate composition with at least one volatile organic solvent selected from the group consisting of hydrocarbons having from about 3 to about 5 carbon atoms; dissolving at least part of said first organic solvent in said volatile organic solvent to form a second solution; and separating said second solution from said intermediate composition to provide a treated product.

69. A process for separating extractable organic material from a feed composition comprising said extractable organic material intermixed with solids and water, the process comprising the steps of:

(A) contacting said feed composition with a first organic solvent, said first organic solvent having an aromatics content in excess of about 50% by volume, an initial boiling point in the range of about 300° F. to about 500° F. and a final boiling point in the range of 650° F. to about 850° F.; dissolving at least part of said extractable organic material in said first organic solvent to form a first solution; and separating at least part of said first solution from said feed composition to provide an intermediate composition, part of said first organic solvent remaining intermixed with said intermediate composition; and (B) contacting said intermediate composition with a volatile organic solvent, said volatile organic solvent being selected from the group of hydrocarbons having from about 3 to about 5 carbon atoms; dissolving at least part of said first organic solvent in said volatile organic solvent to form a second solution; and separating said second solution from said intermediate composition to provide a treated product.

70. A process for separating extractable organic material from a feed composition comprising said extractable organic material intermixed with solids and water, the process comprising the steps of:

(A) contacting said feed composition with a first organic solvent, said first organic solvent having an aromatics content in excess of about 50% by volume, an initial boiling point in the range of about 300° F. to about 500° F. and a final boiling point in the range of 650° F. to about 850° F.; dissolving at least part of said extractable organic material in said first organic solvent to form a first solution; and separating at least part of said first solution from said feed composition to provide an intermediate composition, part of said first organic solvent remaining intermixed with said intermediate composition; and (B) contacting said intermediate composition with a volatile organic solvent, said volatile organic solvent being different than said first organic solvent and comprising a mixture of hydrocarbons having from about 5 to about 7 carbon atoms; dissolving at least part of said first organic solvent in said volatile organic solvent to form a second solution; and separating said second solution from said intermediate composition to provide a treated product.

71. A process for separating extractable organic material from a feed composition comprising said extractable organic material intermixed with solids, water and one or more metals or metal compounds, the process comprising the steps of:

(I) partially de-watering and de-oiling said sludge:

(II) separating extractable organic materials from said sludge by:

(A) contacting said sludge with a first organic solvent, said first organic solvent being capable of dissolving at least about ten parts of said extractable organic material per million parts of said first organic solvent at the temperature wherein at least about 50% by weight of said first organic solvent boils at atmospheric pressure; dissolving at least part of said extractable organic material in said first organic solvent to form a first solution; and separating at least part of said first solution from said feed composition to provide an intermediate composition, part of said first organic solvent remaining intermixed with said intermediate composition; and (B) contacting said intermediate composition with a volatile organic solvent, said volatile organic solvent being different than and more volatile than said first organic solvent and being capable of dissolving at least about ten parts of said first organic solvent per million parts of said volatile organic solvent at the temperature wherein at least about 50% by weight of said volatile organic solvent boils at atmospheric pressure; dissolving at least part of said first organic solvent in said volatile organic solvent to form a second solution; and separating said second solution from said intermediate composition to provide a treated product; and (III) contacting said treated product with an effective amount of one or more fixation chemicals to fix said metal, metal compound or mixtures thereof to said solids.

* * * * *